US010922855B2

(12) United States Patent
Fu

(10) Patent No.: US 10,922,855 B2
(45) Date of Patent: Feb. 16, 2021

(54) SYSTEMS AND METHODS FOR DETERMINING AT LEAST ONE ARTIFACT CALIBRATION COEFFICIENT

(71) Applicant: SHANGHAI UNITED IMAGING HEALTHCARE CO., LTD., Shanghai (CN)

(72) Inventor: Jianwei Fu, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 144 days.

(21) Appl. No.: 16/205,152

(22) Filed: Nov. 29, 2018

(65) Prior Publication Data
US 2019/0206096 A1 Jul. 4, 2019

(30) Foreign Application Priority Data

Nov. 30, 2017 (CN) .......................... 2017 1 1244741
Dec. 18, 2017 (CN) .......................... 2017 1 1363321

(51) Int. Cl.
G01T 1/34 (2006.01)
G06T 7/00 (2017.01)
(Continued)

(52) U.S. Cl.
CPC .......... G06T 11/008 (2013.01); G01T 1/2985 (2013.01); G01T 7/005 (2013.01);
(Continued)

(58) Field of Classification Search
USPC .............. 358/3.21–3.27, 448–464, 504–537; 382/128–140, 155–308
See application file for complete search history.

(56) References Cited

U.S. PATENT DOCUMENTS

2006/0049358 A1* 3/2006 Oumi .................... G06T 11/005
250/370.08
2010/0215140 A1* 8/2010 Sauer .................... G06T 11/006
378/4
(Continued)

FOREIGN PATENT DOCUMENTS

CN 103310432 A 9/2013
CN 103315763 A 9/2013
(Continued)

OTHER PUBLICATIONS

Zhang, Xuesong et al., Cupping Artifacts Calibration in CT Image Based on Radon Transform, CT Theory and Applications, 25(5): 539-546, 2016.
(Continued)

Primary Examiner — Marcellus J Augustin
(74) Attorney, Agent, or Firm — Metis IP LLC

(57) ABSTRACT

A method for determining at least one artifact calibration coefficient is provided. The method may include obtaining preliminary projection values of a first object. The radiation rays may be detected by at least one radiation detector. The method may further include generating a preliminary image of the first object based on the preliminary projection values of the first object and generating calibrated projection values of the first object based on the preliminary image. The method may further include determining a relationship between the preliminary projection values and the calibrated projection values. The method may further include, for each of the at least one radiation detector, determining a location of the radiation detector and determining an artifact calibration coefficient corresponding to the radiation detector based on the relationship between the preliminary projection values and the calibrated projection values and the location of the radiation detector.

20 Claims, 13 Drawing Sheets

(51) Int. Cl.
G01T 1/29 (2006.01)
G06T 11/00 (2006.01)
G01T 7/00 (2006.01)
(52) U.S. Cl.
CPC .......... *G06T 7/0012* (2013.01); *G06T 11/005* (2013.01); *G06T 2207/10081* (2013.01)

(56) References Cited

U.S. PATENT DOCUMENTS

| | | | |
|---|---|---|---|
| 2012/0093280 A1* | 4/2012 | Konno | A61B 6/032 378/7 |
| 2014/0112565 A1* | 4/2014 | Roessl | G06T 11/005 382/131 |
| 2016/0306056 A1 | 10/2016 | Sun et al. | |
| 2017/0205360 A1* | 7/2017 | Cinquin | G01N 23/04 |

FOREIGN PATENT DOCUMENTS

| | | |
|---|---|---|
| CN | 103366389 A | 10/2013 |
| CN | 105118030 A | 12/2015 |
| CN | 105608721 A | 5/2016 |
| CN | 105631909 A | 6/2016 |
| CN | 106296615 A | 1/2017 |
| CN | 107341838 A | 11/2017 |

OTHER PUBLICATIONS

First Office Action in Chinese Application No. 201711244741.4 dated Jul. 3, 2020, 9 pages.
Jiming Ma et al., Ring Artifact Correction for X-ray Computed Tomography, High Power Laser and Particle Beams, 26(12), 2014.

* cited by examiner

500

```
┌─────────────────────────────────────────────────────┐
│ Obtaining preliminary projection values of a first  │  ~ 502
│ object generated based on radiation rays that are   │
│ emitted from a radiation emitter and passed through │
│ the first project, where the radiation rays are     │
│ detected by at least one radiation detector         │
└─────────────────────────────────────────────────────┘
                          ↓
┌─────────────────────────────────────────────────────┐
│ Generating a preliminary image of the first object  │  ~ 504
│ based on the preliminary projection values of the   │
│ first object                                        │
└─────────────────────────────────────────────────────┘
                          ↓
┌─────────────────────────────────────────────────────┐
│ Generating calibrated projection values of the      │  ~ 506
│ first object based on the preliminary image         │
└─────────────────────────────────────────────────────┘
                          ↓
┌─────────────────────────────────────────────────────┐
│ Determining a relationship between the preliminary  │  ~ 508
│ projection values and the calibrated projection     │
│ values                                              │
└─────────────────────────────────────────────────────┘
                          ↓
┌─────────────────────────────────────────────────────┐
│ For each of the at least one radiation detector,    │  ~ 510
│ determining a location of the radiation detector    │
└─────────────────────────────────────────────────────┘
                          ↓
┌─────────────────────────────────────────────────────┐
│ For each of the at least one radiation detector,    │  ~ 512
│ determining an artifact calibration coefficient     │
│ corresponding to the radiation detector based on    │
│ the location of the radiation detector and the      │
│ relationship between the preliminary projection     │
│ values and the calibrated projection values         │
└─────────────────────────────────────────────────────┘
```

802 — Performing an equal-spaced parallel beam projection on the calibrated image to obtain the forward projection values 804 — Performing an interpolation on the forward projection values to obtain the calibrated projection values corresponding to at least one actual position of the at least one detector 806 — Reversely rebinning the calibrated projection values corresponding to the at least one actual position of the at least one detector to obtain the calibrated projection values

FIG. 8

SYSTEMS AND METHODS FOR DETERMINING AT LEAST ONE ARTIFACT CALIBRATION COEFFICIENT

CROSS-REFERENCE TO RELATED APPLICATIONS

This application claims priority to Chinese Patent Application No. 201711363321.8, filed on Dec. 18, 2017, and Chinese Patent Application No. 201711244741.4, filed on Nov. 30, 2017, the contents of each of which are hereby incorporated by reference.

TECHNICAL FIELD

The present disclosure generally relates to imaging technology, and more particularly, relates to systems and methods for determining at least one artifact calibration coefficient and reconstructing a corrected image of an object based on the at least one artifact calibration coefficient.

BACKGROUND

Imaging technology has been widely used for clinical examination and medical diagnosis. Artifacts may be present in a reconstructed image and may greatly affect the quality of the reconstructed image. There are various types of artifacts, such as a streak artifact, a shading artifact, a ring artifact, a banding artifact, etc. The ring artifact is often caused by the inconsistent intensity responses of radiation detectors and/or abnormal responses to radiation rays of different energy levels. For a reconstructed computed tomography (CT) image, the ring artifact may significantly influence the measured result of attenuation of the radiation rays that passed through a certain part of an object (e.g., a patient, an organ, or tissue). Sometimes the ring artifact may influence the medical diagnosis. To reduce or eliminate the ring artifacts, an artifact calibration coefficient corresponding to each radiation detector is often used to generate a corrected image of the object. Many existing methods for reducing or eliminating the ring artifacts are not effective enough. Therefore, it is desirable to provide systems and methods for determining the calibration coefficient(s) more accurately and more efficiently.

SUMMARY

According to a first aspect of the present disclosure, a method for determining at least one artifact calibration coefficient is provided. The method may be implemented on a computing device having at least one storage device storing a set of instructions and at least one processor in communication with the at least one storage device. The method may include obtaining, by the at least one processor, preliminary projection values of a first object. The preliminary projection values may be generated based on radiation rays that are emitted from a radiation emitter and passed through the first project. The radiation rays may be detected by at least one radiation detector. The method may further include generating, by the at least one processor, a preliminary image of the first object based on the preliminary projection values of the first object. The method may further include generating, by the at least one processor, calibrated projection values of the first object based on the preliminary image. The method may further include determining, by the at least one processor, a relationship between the preliminary projection values and the calibrated projection values.

The method may further include, for each of the at least one radiation detector, determining, by the at least one processor, a location of the radiation detector and determining, by the at least one processor, an artifact calibration coefficient corresponding to the radiation detector based on the relationship between the preliminary projection values and the calibrated projection values and the location of the radiation detector.

In some embodiments, generating the calibrated projection values of the first object based on the preliminary image may include generating a calibrated image of the first object based on the preliminary image and generating the calibrated projection values based on the calibrated image.

In some embodiments, the first object may be a phantom made of a single material. Generating the calibrated image of the first object based on the preliminary image may include obtaining a value of each of pixels in the preliminary image, determining an average value of at least portion of the pixels in the preliminary image, and assigning the average value of the at least portion of the pixels as a new value to the each of the at least portion of the pixels in the preliminary image to generate the calibrated image.

In some embodiments, the first object may be a phantom including a body made of a first material and a shell made of a second material. Generating the calibrated image of the first object based on the preliminary image may include obtaining a value of each of first pixels in the preliminary image associated with the body of the first object and a value of each of second pixels in the preliminary image associated with the shell of the first object. Generating the calibrated image of the first object based on the preliminary image may further include determining an average value of the first pixels, assigning the average value of the first pixels as a new value to the each of the first pixels, and retaining the value of the each of second pixels to generate the calibrated image.

In some embodiments, generating the calibrated projection values based on the calibrated image may include performing a forward projection on the calibrated image to generate forward projection values, and for each of the at least one radiation detector, determining a calibrated projection value for the radiation detector based on the location of the radiation detector and the forward projection values.

In some embodiments, generating the calibrated projection values of the first object based on the preliminary image may include obtaining a cross-section equation of the first object based on the preliminary image of the first object and obtaining a series of scanning equations, wherein each of the series of scanning equations is associated with one of the radiation rays. Generating the calibrated projection values of the first object based on the preliminary image may further include determining the calibrated projection values of the first object based on the cross-section equation and the series of scanning equations of the first object.

In some embodiments, determining the calibrated projection values of the first object based on the cross-section equation and the series of scanning equations of the first object may include, for each of the series of scanning equations, determining, when there is no solution satisfying both the scanning equation and the cross-section equation, the calibrated projection value as zero; determining, when there is only one solution satisfying both the scanning equation and the cross-section equation, the calibrated projection value as zero; and determining, when there are two solutions satisfying both the scanning equation and the cross-section equation, the calibrated projection value based on the distance between the two solutions.

In some embodiments, wherein the relationship between the preliminary projection values and the calibrated projection values is represented by a fitting curve.

In some embodiments, the method may further include performing a preprocessing on the preliminary projection values to generate preprocessed projection value, and generating the preliminary image based on preprocessed projection values.

In some embodiments, the method may further include obtaining, by the at least one processor, preliminary projection values of a second object generated based on radiation rays that are emitted from the radiation emitter and passed through the second object. The radiation rays may be detected by the at least one radiation detector. the method may further include determining corrected projection values of the second object based on the preliminary projection values of the second object and the at least one artifact calibration coefficient associated with the at least one radiation detector, and generating a corrected image of the second object based on the corrected projection values.

According to another aspect of the present disclosure, a system for determining at least one artifact calibration coefficient is provided. The system may include at least one storage medium storing a set of instructions and at least one processor configured to communicate with the at least one storage medium, wherein when executing the set of instructions, the at least one processor may be directed to cause the system to obtain preliminary projection values of a first object generated based on radiation rays that are emitted from a radiation emitter and passed through the first project. The radiation rays may be detected by at least one radiation detector. The least one processor may be further directed to cause the system to generate a preliminary image of the first object based on the preliminary projection values of the first object, generate calibrated projection values of the first object based on the preliminary image, and determine a relationship between the preliminary projection values and the calibrated projection values. The least one processor may be further directed to cause the system to, for each of the at least one radiation detector, determine a location of the radiation detector and determine an artifact calibration coefficient corresponding to the radiation detector based on the relationship between the preliminary projection values and the calibrated projection values and the location of the radiation detector.

According to yet another aspect of the present disclosure, a non-transitory computer readable medium is provided. The non-transitory computer readable medium may include at least one set of instructions for determining at least one artifact calibration coefficient. When executed by at least one processor of a computer device, the at least one set of instructions may direct the at least one processor to obtain preliminary projection values of a first object generated based on radiation rays that are emitted from a radiation emitter and passed through the first project. The radiation rays may be detected by at least one radiation detector. The at least one set of instructions may further direct the at least one processor to generate a preliminary image of the first object based on the preliminary projection values of the first object, generate calibrated projection values of the first object based on the preliminary image, and determine a relationship between the preliminary projection values and the calibrated projection values. The at least one set of instructions may further direct the at least one processor to, for each of the at least one radiation detector, determine a location of the radiation detector and determine an artifact calibration coefficient corresponding to the radiation detector based on the relationship between the preliminary projection values and the calibrated projection values and the location of the radiation detector.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flowchart illustrating an exemplary process for determining at least one artifact calibration coefficient according to some embodiments of the present disclosure;

FIG. 8 is a flowchart illustrating an exemplary process for determining calibrated projection values based on a calibrated image according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
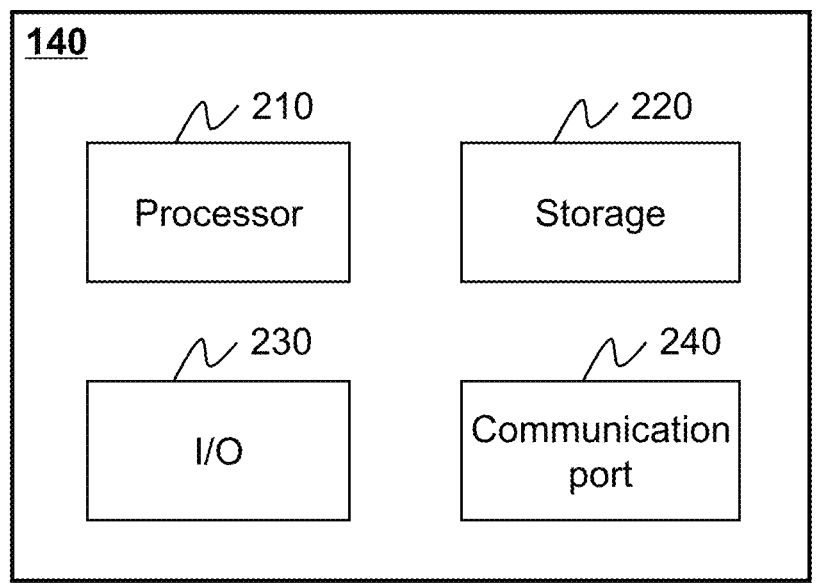
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for an imaging system. In some embodiments, the imaging system may include a single modality imaging system and/or a multi-modality imaging system. The single modality imaging system may include, for example, an X-ray imaging system, an computed tomography (CT) system, a magnetic resonance imaging (MRI) system, an ultrasonography system, a positron emission tomography (PET) system, or the like, or any combination thereof. The multi-modality imaging system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a digital subtraction angiography-magnetic resonance imaging (DSA-MRI) system, etc. It should be noted that the imaging system described below is merely provided for illustration purposes, and not intended to limit the scope of the present disclosure.

The present disclosure provides mechanisms (which can include methods, systems, computer-readable medium, etc.) for determining at least one artifact calibration coefficient. An imaging device may perform one or more scans on a first object (e.g., a phantom) to obtain preliminary projection values of the first object. A preliminary image of the first object may be generated based on the preliminary projection values of the first object. In some embodiments, a calibrated image of the first object may be generated based on the preliminary image and calibrated projection values may be generated based on the calibrated image. In some embodiments, the calibrated projection values may be determined based on a cross-section equation of the first object and a series of scanning equations associated with radiation rays emitted from a radiation emitter and detected by at least one radiation detector of the imaging device. For each of the at least one radiation detector of the imaging device, one or more preliminary projection values and one or more corresponding calibrated projection values related to the radiation detector may be determined. A calibration coefficient may be determined for each of the at least one radiation detector based on the one or more preliminary projection values and the one or more corresponding calibrated projection values related to the radiation detector, for example, using a fitting algorithm. The calibration coefficient(s) of the at least one radiation detector may be used to correct the preliminary projection values of a second object (e.g., a patient, an organ, or tissue) to reduce or eliminate artifacts associated with the at least one radiation detector.

Figure 1:
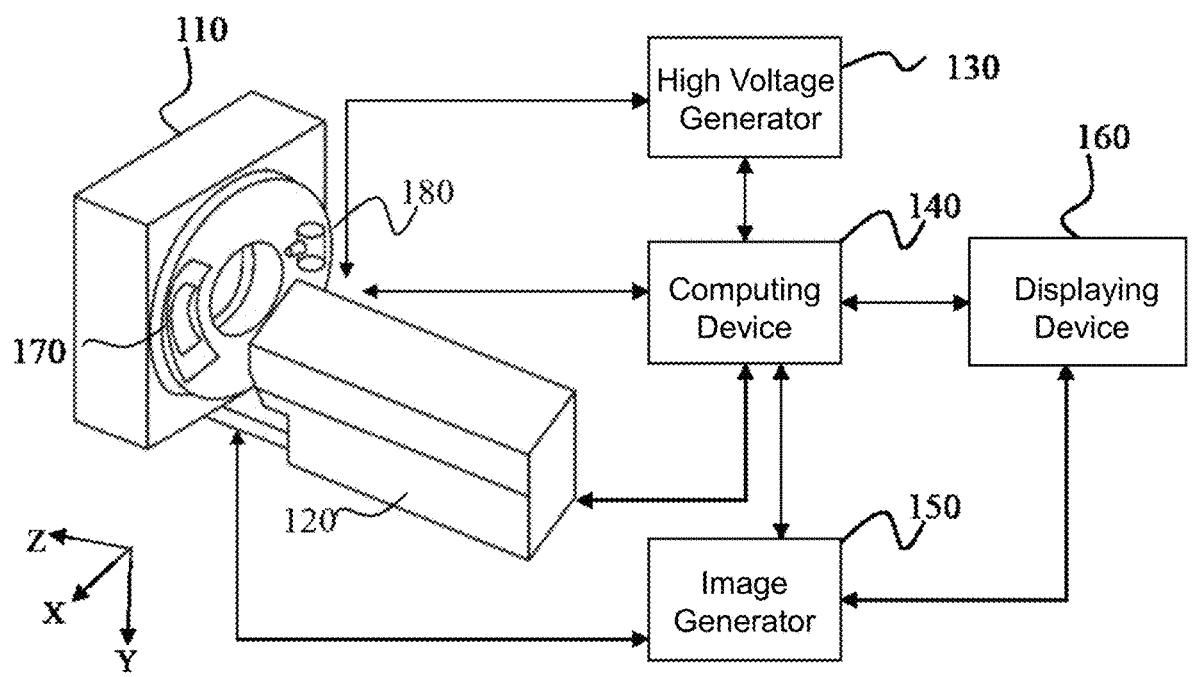
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. In some embodiments, the imaging system 100 may scan an object to obtain preliminary projection values and generate an image associated with the object. In some embodiments, the imaging system 100 may be a medical imaging system, for example, a Positron Emission Tomography (PET) device, a Computed Tomography (CT) device, a Magnetic resonance imaging device (MRI), or the like. In some embodiments, the imaging system 100 may include an imaging device, a computing device 140, an image generator 150, and a displaying device 160.

The imaging device may generate or provide image data via scanning an object (e.g., a patient) disposed on a scanning table of the imaging device. In some embodiments, the imaging device may include a single-modality scanner and/or multi-modality scanner. The single-modality scanner may include, for example, a computed tomography (CT) scanner. The multi-modality scanner may include a single photon emission computed tomography-computed tomography (SPECT-CT) scanner, a positron emission tomography-computed tomography (PET-CT) scanner, a computed tomography-ultra-sonic (CT-US) scanner, a digital subtraction angiography-computed tomography (DSA-CT) scanner, or the like, or a combination thereof. In some embodiments, the image data may include projection data, images relating to the object, etc. The projection data may be raw data generated by the imaging device by scanning the object or data generated by a forward projection on an image relating to the object. In some embodiments, the object may include a body, a substance, an object, or the like, or a combination thereof. In some embodiments, the object may include a specific portion of a body, such as a head, a thorax, an abdomen, or the like, or a combination thereof. In some embodiments, the object may include a specific organ or region of interest, such as an esophagus, a trachea, a bronchus, a stomach, a gallbladder, a small intestine, a colon, a bladder, a ureter, a uterus, a fallopian tube, etc.

As shown in FIG. 1, the imaging device may include a scanning cavity 110, a scanning table 120, and a high voltage generator 130. The scanning cavity 110 may contain components for generating and detecting radioactive rays. In some embodiments, the scanning cavity 110 may contain a radiation generator 180 and a radiation detector 170. The radiation generator 180 may emit radioactive rays. The radioactive rays may be emitted toward an object placed in the scanning cavity 110 and may pass through the object and be received by the radiation detector 170. As an example, the radiation generator 180 may be an X-ray tube. The X-ray tube may emit X-rays that pass through an object placed inside the scanning cavity 110 and may be received by the radiation detector 170. In some embodiments, the radiation detector 170 may be a circular radiation detector, a square radiation detector, an arc radiation detector, a planar radiation detector, or the like. In some embodiments, there may be multiple radiation detectors 170 (also referred to as detector units). The scanning table 120 may support an object to be detected (e.g., a patient, a phantom, etc.). In some embodiments, the scanning table 120 may move inside the scanning cavity 110 during the detection process. As shown in FIG. 1, the scanning table 120 may move along the Z-axis direction before, during or after a scan. Depending on the needs of the test, the patient may be supine, prone, with the head in the front or foot. In some embodiments, the scanning table 120 may move inside the scanning cavity 110 at a constant speed. The speed at which the scanning table 120 moves may be related to factors such as scanning time, a scanning region, or the like, or any combination thereof. In some embodiments, the speed at which the scanning table 120 moves may be the system default value, and may also be set by the user. The high voltage generator 130 may generate a high voltage or a strong current. In some embodiments, the generated high voltage or strong current may be transmitted to the radiation generator 180.

In some embodiments, the imaging device may be integrated with one or more other devices that may facilitate the scanning of the object, such as, an image-recording device. The image-recording device may be configured to take various types of images related to the object. For example, the image-recording device may be a two-dimensional (2D) camera that takes pictures of the exterior or outline of the object. As another example, the image-recording device may be a 3D scanner (e.g., a laser scanner, an infrared scanner, a 3D CMOS sensor) that records the spatial representation of the object.

In some embodiments, the computing device 140 may control the scanning cavity 110 to rotate to a certain position. This location may be a default value of the imaging system 100, and may also be set by the user (e.g., a doctor, a nurse). In some embodiments, the computing device 140 may control the high voltage generator 130. For example, the computing device 140 may control the intensity of the voltage or current generated by the high voltage generator 130. In some embodiments, the computing device 140 may control the displaying device 160. For example, the computing device 140 may control and display relevant parameters. The parameters may include display size, display scale, display order, display quantity, or the like, or any combination thereof. The computing device 140 may process data and/or information obtained from the imaging device, the storage device, the terminal(s), or other components of the imaging system 100. For example, the computing device 140 may reconstruct an image based on projection data generated by the imaging device. As another example, the computing device 140 may determine the position of a target region (e.g., a region in a patient) to be scanned by the imaging device. In some embodiments, the computing device 140 may be a single server or a server group. The server group may be centralized or distributed. In some embodiments, the computing device 140 may be local to or remote from the imaging system 100. For example, the computing device 140 may access information and/or data from the imaging device, the storage device, and/or the terminal(s) via the network. As another example, the computing device 140 may be directly connected to the imaging device, the terminal(s), and/or the storage device to access information and/or data. In some embodiments, the computing device 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the computing device 140 may be implemented by a computing device 140 having one or more components as described in connection with FIG. 2.

The storage device may store data, instructions, and/or any other information. In some embodiments, the storage device may store data obtained from the computing device 140, the terminal(s), and/or the interaction device 150. In some embodiments, the storage device may store data and/or instructions that the computing device 140 may execute or use to perform exemplary methods described in the present disclosure. In some embodiments, the storage device may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device may be implemented on a cloud platform as described elsewhere in the disclosure. One or more components of the imaging system 100 may access the data or instructions stored in the storage device via the network. In some embodiments, the storage device may be part of the computing device 140.

The image generator 150 may generate an image. In some embodiments, the image generator 150 may perform operations such as image preprocessing, image reconstruction, and/or artifact correction. In some embodiments, the image generator 150 may be integrated in the computing device 140. In some embodiments, the image generator 150 may receive data from the radiation detector(s) 170 or an external data source and generate an image based on the received data. In some embodiments, the image generator 150 may transmit the generated image to the displaying device 160 for display.

The displaying device 160 may display the received data or image. In some embodiments, the displaying device 160 may display an image generated by the image generator 150. In some embodiments, the displaying device 160 may be a terminal including input devices. A user may send an instruction to the image generator 150 and/or the computing device 140 via the displaying device 160. For example, the user may set imaging parameters through displaying device 160, which may be sent to computing device 140. The imaging parameters may include data acquisition parameters and image reconstruction parameters, and the like. For example, the terminal(s) may obtain a processed image from the computing device 140. As another example, the terminal(s) may obtain image data acquired via the imaging device and transmit the image data to the computing device 140 to be processed. In some embodiments, the terminal(s) may include a mobile device, a tablet computer, a laptop computer, or the like, or any combination thereof. For example, the mobile device may include a mobile phone, a personal digital assistance (PDA), a gaming device, a navigation device, a point of sale (POS) device, a laptop, a tablet computer, a desktop, or the like, or any combination thereof. In some embodiments, the terminal(s) may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the computing device 140 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) may be part of the computing device 140.

The computing device 140, the scanning cavity 110, the radiation generator 180, the radiation detector 170, the high voltage generator 130, the scanning table 120, the image generator 150, and/or the displaying device 160 may be connected indirectly by direct or indirect means. For example, these devices of the imaging system 100 may be connected to and/or communicate with each other via a wireless connection (e.g., a network), a wired connection, or a combination thereof. The connection between the components of the imaging system 100 may be variable. The network may include any suitable network that can facilitate exchange of information and/or data for the imaging system 100. For example, the network may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network may include one or more network access points. For example, the network may include wired and/or wireless network access points such as base stations and/or internet exchange points through which one or more components of the imaging system 100 may be connected to the network to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device may be a data storage including cloud computing platforms, such as public cloud, private cloud, community, and hybrid clouds, etc. However, those variations and modifications do not depart the scope of the present disclosure.

FIG. 2 is a schematic diagram illustrating exemplary hardware and/or software components of an exemplary computing device 140 on which the computing device 140 may be implemented according to some embodiments of the present disclosure. As illustrated in FIG. 2, the computing device 140 may include a processor 210, a storage 220, an input/output (I/O) 230, and a communication port 240.

The processor 210 may execute computer instructions (e.g., program code) and perform functions of the computing device 140 in accordance with techniques described herein. The computer instructions may include, for example, routines, programs, objects, components, data structures, procedures, modules, and functions, which perform particular functions described herein. For example, the processor 210 may process image data obtained from the imaging device, the terminals, the storage device, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 140. However, it should be noted that the computing device 140 in the present disclosure may also include multiple processors, thus operations and/or method operations that are performed by one processor as described in the present disclosure may also be jointly or separately performed by the multiple processors. For example, if in the present disclosure the processor of the computing device 140 executes both operation A and operation B, it should be understood that operation A and operation B may also be performed by two or more different processors jointly or separately in the computing device 140 (e.g., a first processor executes operation A and a second processor executes operation B, or the first and second processors jointly execute operation s A and B).

The storage 220 may store data/information obtained from the imaging device, the terminals, the storage device, and/or any other component of the imaging system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the computing device 140 for determining the position of a target region of an object (e.g., a target portion of a patient).

The I/O 230 may input and/or output signals, data, information, etc. In some embodiments, the I/O 230 may enable a user interaction with the computing device 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network) to facilitate data communications. The communication port 240 may establish connections between the computing device 140 and the imaging device, the terminals, and/or the storage device. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
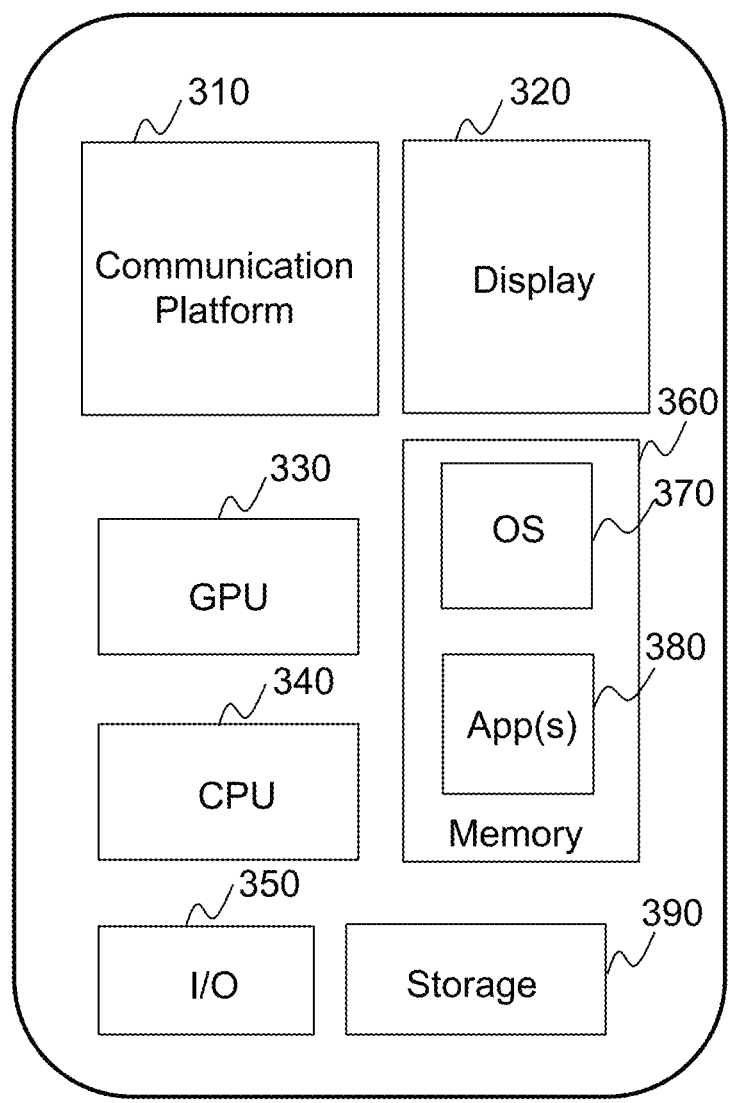
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminals may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the computing device 140. User interactions with the information stream may be achieved via the I/O 350 and provided to the computing device 140 and/or other components of the imaging system 100 via the network.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
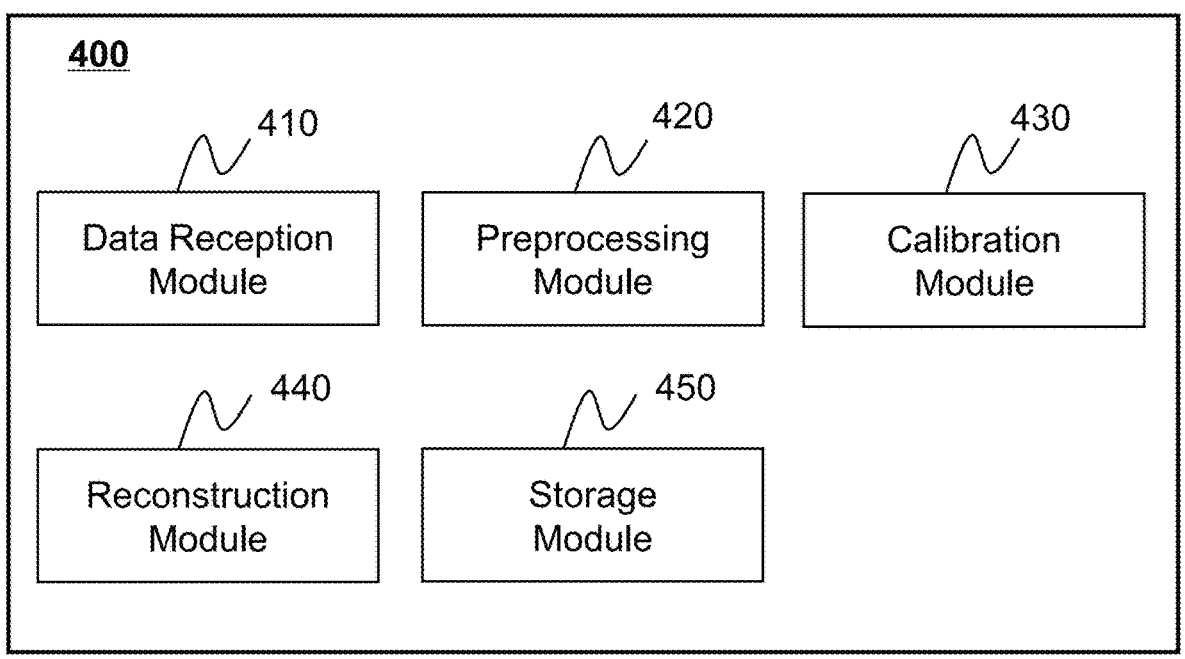
FIG. 4 is a block diagram illustrating an exemplary artifact correction device according to some embodiments of the present disclosure.

FIG. 4 is a block diagram illustrating an exemplary artifact correction device 400 according to some embodiments of the present disclosure. In some embodiments, the artifact correction device 400 may be implemented as a processor (e.g., the processor 210 of the computing device 140). As illustrated in FIG. 4, the artifact correction device 400 may include a data reception module 410, a preprocessing module 420, a calibration module 430, a reconstruction module 440, and a storage module 450. The modules may be hardware circuits of all or part of the artifact correction device 400. The modules may also be implemented as an application or set of instructions read and executed by the artifact correction device 400. Further, the modules may be any combination of the hardware circuits and the application/instructions. For example, the modules may be the part of the artifact correction device 400 when the artifact correction device 400 is executing the application/set of instructions.

The data reception module 410 may obtain and/or receive data related to the imaging system 100. In some embodiments, the data reception module 410 may obtain and/or receive data from one or more components of the imaging system 100. For example, the data reception module 410 may receive data related to an object. The data related to the object may include preliminary projection values of the object, preliminary information of the object (e.g., the name, the age, the gender, the height, or the weight), scanning parameters, or the like, or any combination thereof. The data reception module 410 may receive the preliminary projection values or preliminary projection data of a first object from an imaging device (e.g., a CT scanner, an MRI scanner, or a PET scanner) and/or a storage (e.g., the storage 220 of the computing device 140). In some embodiments, the data reception module 410 may obtain at least one calibration coefficient corresponding to the at least one radiation detector from the storage.

The preprocessing module 420 may preprocess data related to the imaging system 100. In some embodiments, the preprocessing module 420 may preprocess the preliminary projection values of the object to obtain preprocessed projection values. The preprocessing operation may eliminate or reduce the error caused by known physical factors on the preliminary projection values. For example, the preprocessing operation may include air correction, crosstalk correction, off-focal correction, beam hardening correction, or the like, or any combination thereof.

The calibration module 430 may generate calibrated projection values of an object. In some embodiments, the calibration module 430 may generate a calibrated image of the first object based on the preliminary image and generate the calibrated projection values based on the calibrated image. For example, when the first object is a uniform phantom made of a single material, the calibration module 430 may classify the pixels in the preliminary image into material pixels of the phantom body (pixels corresponding to at least a part of the phantom) and air pixels (pixels corresponding to air inside and/or around the phantom) using a threshold method and/or an image segmentation algorithm. The calibration module 430 may obtain a value of each of the material pixels of the phantom body and determine an average value of the material pixels of the phantom body. To generate the calibrated image, the average value of the material pixels of the phantom body may be assigned to each of the material pixels of the phantom body in the preliminary image as a new value and the value of each of the air pixels may be set as 0. As another example, when the first object is a phantom having a body made of a first material and a shell made of a second material, the calibration module 430 may classify the pixels in the preliminary image into material pixels of the phantom body (also referred to as first pixels), material pixels of the phantom shell (also referred to as second pixels), and air pixels. The calibration module 430 may obtain a value of each of the first pixels in the preliminary image and a value of each of the second pixels in the preliminary image. An average value may be determined for the first pixels. To generate the calibrated image, the average value of the first pixels may be assigned as a new value to each of the first pixels, the value of each of the second pixels may be retained unchanged, and the value of each of the air pixels may be set as 0. The calibration module 430 may further perform a forward projection (e.g., an equal-spaced parallel beam projection) on the calibrated image to generate the calibrated projection values.

In some embodiments, the calibration module 430 may obtain a cross-section equation of the first object based on the preliminary image of the first object. Merely by way of example, the cross section of the first object may be an ellipse. The calibration module 430 may obtain a series of scanning equations (e.g., straight line equations), where each of the series of scanning equations may be associated with a radiation ray emitted from the radiation emitter. The calibration module 430 may further determine the calibrated projection values based on the cross-section equation and the series of scanning equations. For instance, for each of the series of scanning equations, the calibration module 430 may determine whether there is a solution satisfying both the cross-section equation and the scanning equation. In response to a determination that there is no solution or only one solution satisfying both the cross-section equation and the scanning equation, the calibrated projection value corresponding to the radiation ray may be determined as 0. In response to a determination that there are two solutions satisfying both the cross-section equation and the scanning equation, the calibrated projection value corresponding to the radiation ray may be determined based on the distance between the two solutions (e.g., intersection points).

In some embodiments, the calibration module 430 may determine at least one calibration coefficient corresponding to the at least one radiation detector based on the preprocessed projection values (or the preliminary projection values) and the calibrated projection values of the first object. In some embodiments, the artifact correction device 400 may further include a correction module (not shown in FIG. 4). The correction module may determine corrected projection values of a second object (e.g., a patient) based on the at least one calibration coefficient and preprocessed projection values (or the preliminary projection values) of the second object.

The reconstruction module 440 may reconstruct an image. In some embodiments, the reconstruction module 440 may generate a preliminary image of the first object based on the preliminary projection values or the preprocessed projection values of the first object using an imaging reconstruction algorithm. In some embodiments, the reconstruction module 440 may generate a corrected image of the second object (e.g., a patient) based on the corrected projection values of the second object. An exemplary imaging reconstruction algorithm may include an iterative algorithm, a filtered back projection algorithm, a Radon transform algorithm, a direct Fourier algorithm, or the like, or any combination thereof.

The storage module 450 may store information related to the imaging system 100. In some embodiments, the storage module 450 may store a calibration table. The calibration table may include the at least one calibration coefficient corresponding to the at least one radiation detector. In some embodiments, the storage module 450 may store the preliminary projection values of an object, the preliminary information of the object, scanning parameters, or the like, or any combination thereof. In some embodiments, the storage module 450 may store an reconstructed image (e.g., a corrected image of a second object).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the artifact correction device 400 may include one or more additional modules. For example, the artifact correction device 400 may further include a control module configured to generate control signals for one or more components in the imaging system 100.

FIG. 5 is a flowchart illustrating an exemplary process for determining at least one artifact calibration coefficient according to some embodiments of the present disclosure. At least a portion of process 500 may be implemented on the computing device 140 as illustrated in FIG. 2 or the mobile device 300 as illustrated in FIG. 3. In some embodiments, one or more operations of the process 500 may be implemented in the imaging system 100 as illustrated in FIG. 1. In some embodiments, one or more operations in the process 500 may be stored in the storage (e.g., the ROM 230, the RAM 240) as a form of instructions, and invoked and/or executed by the computing device 140 (e.g., the processor 210 of the computing device 140). In some embodiments, the instructions may be transmitted in a form of electronic current or electrical signals.

In 502, the processor 210 (e.g., the data reception module 410) may obtain preliminary projection values of a first object generated based on radiation rays that are emitted from a radiation emitter and passed through the first object, where the radiation rays are detected by at least one radiation detector. In some embodiments, the first object may include a phantom. As used herein, the term "phantom" (also referred to as "imaging phantom") refers to a specially designed object to evaluate, analyze, and tune the performance of various imaging devices. For example, the phantom may be a uniform phantom made of a single material. As another example, the phantom may include a body made of a first material and a shell made of a second material. In some embodiments, the shape of the phantom may include but not limited to a cylinder, a sphere, a cube, a simulation shape of a human body or a part thereof (e.g., a whole body, a head, a lung, an abdomen), or the like. In some embodiments, the phantom may be made of teflon, propylene, polyethylene, resin, or the like, or any combination thereof. The imaging device may perform at least one scan on the first object placed at one or more positions on the scanning table 120. The at least one radiation detector may receive the radiation rays that passed through the first object and generate preliminary projection values of the first object. In some embodiments, the preliminary projection values may be determined based on the intensity distribution of the energy of the radiation beams emitted from the radiation emitter and the intensity distribution of the energy of the radiation beams detected by the plurality of detector elements (e.g., the preliminary projection values).

In 504, the processor 210 (e.g., the reconstruction module 440) may generate a preliminary image of the first object based on the preliminary projection values of the first object. In some embodiments, the processor 210 may preprocess (or pre-correct) the preliminary projection values to generate preprocessed projection values. The preprocessing may eliminate or reduce the influence of known physical factors (e.g., detector gain, beam hardening) on the preliminary projection values. For example, the preprocessing may include air correction, crosstalk correction, off-focal correction, beam hardening correction, or the like, or any combination thereof. In some embodiments, the processor 210 may reconstruct the preliminary image of the first object based on the preprocessed projection values using an image reconstruction algorithm. Exemplary imaging reconstruction algorithms may include an iterative algorithm, a filtered back projection algorithm, a Radon transform algorithm, a direct Fourier algorithm, or the like, or any combination thereof. In some embodiments, there may be one or more artifacts in the preliminary image of the first object. The one or more artifacts may include a streak artifact, a shading artifact, a ring artifact, a banding artifact, or the like, or any combination thereof.

In 506, the processor 210 (e.g., the calibration module 430) may generate calibrated projection values of the first object based on the preliminary image. In some embodiments, the processor 210 may generate a calibrated image of the first object based on the preliminary image and generate the calibrated projection values based on the calibrated image. For example, when the first object is a uniform phantom made of a single material, the processor 210 may classify the pixels in the preliminary image into material pixels of the phantom body (pixels corresponding to at least a part of the phantom) and air pixels (pixels corresponding to air inside and/or around the phantom) using a threshold method and/or an image segmentation algorithm. The processor 210 may obtain a value of each of the material pixels of the phantom body and determine an average value of the material pixels of the phantom body. To generate the calibrated image, the average value of the material pixels of the phantom body may be assigned to each of the material pixels of the phantom body in the preliminary image as a new value and the value of each of the air pixels may be set as 0. As another example, when the first object is a phantom having a body made of a first material and a shell made of a second material, the processor 210 may classify the pixels in the preliminary image into material pixels of the phantom body (also referred to as first pixels), material pixels of the phantom shell (also referred to as second pixels), and air pixels. The processor 210 may obtain a value of each of the first pixels in the preliminary image and a value of each of the second pixels in the preliminary image. An average value may be determined for the first pixels. To generate the calibrated image, the average value of the first pixels may be assigned as a new value to each of the first pixels, the value of each of the second pixels may be retained unchanged, and the value of each of the air pixels may be set as 0. The processor 210 may further perform a forward projection (e.g., an equal-spaced parallel beam projection) on the calibrated image to generate the calibrated projection values.

In some embodiments, the processor 210 may obtain a cross-section equation of the first object based on the preliminary image of the first object. Merely by way of example, the cross section of the first object may be an ellipse. The processor 210 may obtain a series of scanning equations (e.g., straight line equations), where each of the series of scanning equations may be associated with a radiation ray emitted from the radiation emitter. The processor 210 may further determine the calibrated projection values based on the cross-section equation and the series of scanning equations. For instance, for each of the series of scanning equations, the processor 210 may determine whether there is a solution satisfying both the cross-section equation and the scanning equation. In response to a determination that there is no solution or only one solution satisfying both the cross-section equation and the scanning equation, the calibrated projection value corresponding to the radiation ray may be determined as 0. In response to a determination that there are two solutions satisfying both the cross-section equation and the scanning equation, the calibrated projection value corresponding to the radiation ray may be determined based on the distance between the two solutions (e.g., intersection points). More details regarding the determination of the calibrated projection values may be found elsewhere in the present disclosure, for example, in FIG. 8, FIG. 12, and the descriptions thereof.

In 508, the processor 210 (e.g., the calibration module 430) may determine a relationship between the preliminary projection values and the calibrated projection values. For example, the processor 210 may determine a plurality of data groups, where each of the plurality of data group may include a preliminary projection value and a corresponding calibrated projection value.

In 510, for each of the at least one radiation detector, the processor 210 (e.g., the calibration module 430) may determine a location of the radiation detector. In some embodiments, the processor 210 may determine the location of the radiation detector based on the rotation of the gantry and the relative location between the radiation detector and the gantry. In some embodiments, the processor 210 may determine the location of the radiation detector in a coordinate system (e.g., the coordinate system shown in FIG. 1).

In 512, for each of the at least one radiation detector, the processor 210 (e.g., the calibration module 430) may determine an artifact calibration coefficient corresponding to the radiation detector based on the location of the radiation detector and the relationship between the preliminary projection values and the calibrated projection values. In some embodiments, for each of the at least one radiation detector, the processor 210 may perform an interpolation to determine a calibrated projection value associated with the radiation detector. The calibrated projection value associated with the radiation detector may be determined based on the location of the radiation detector and the forward projection values generated based on the calibrated image. In some embodiments, the processor 210 may obtain the artifact calibration coefficient using a polynomial fitting algorithm, a cosine fitting algorithm, a Gaussian fitting algorithm, a least square fitting algorithm, or the like, or any combination thereof. In some embodiments, the processor 210 may generate a calibration table including the artifact calibration coefficient corresponding to each of the at least one radiation detector. The calibration table may be stored in a storage (e.g., the ROM 230, the RAM 240 of the computing device) and/or an external storage device. In some embodiments, the processor 210 may obtain preliminary projection values of a second object (e.g., a patient) and correct the preliminary projection values according to the calibration table. Details regarding the correction of the preliminary projection values of the second object may be found elsewhere in the present disclosure, for example, in FIG. 11 and the descriptions thereof.

It should be noted that the above description regarding the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 6:
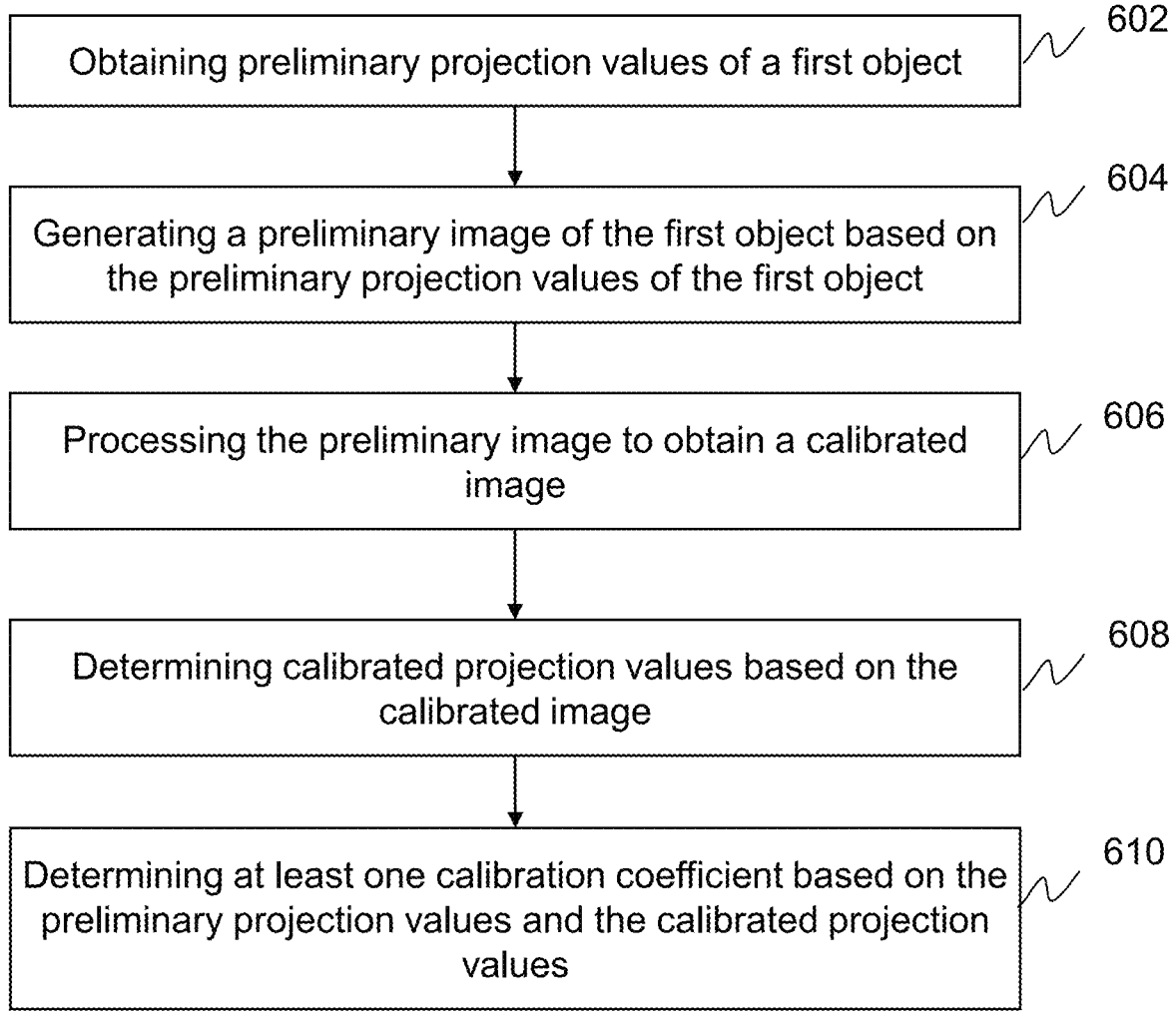
FIG. 6 is a flowchart illustrating an exemplary process for determining at least one artifact coefficient according to some embodiments of the present disclosure.

FIG. 6 is a flowchart illustrating an exemplary process for determining at least one artifact coefficient according to some embodiments of the present disclosure. At least a portion of process 600 may be implemented on the computing device 140 as illustrated in FIG. 2 or the mobile device 300 as illustrated in FIG. 3. In some embodiments, one or more operations of the process 600 may be implemented in the imaging system 100 as illustrated in FIG. 1. In some embodiments, one or more operations in the process 600 may be stored in the storage (e.g., the ROM 230, the RAM 240) as a form of instructions, and invoked and/or executed by the computing device 140 (e.g., the processor 210 of the computing device 140). In some embodiments, the instructions may be transmitted in a form of electronic current or electrical signals.

In 602, the processor 210 (e.g., the data reception module 410) may obtain preliminary projection values of a first object. In some embodiments, the first object may be a phantom. The imaging device (e.g., a multi-detector CT scanner) may scan the phantom and obtain preliminary projection values (or projection data). In some embodiments, the radiation detectors of the multi-detector CT scanner may include a plurality of detector channels. The number of the detector channels may be denoted as nChannelNum (nChannelNum=nChannelNumPerRow×nRowNum), where nRowNum refers to the number of rows of the radiation detector, and nChannelNumPerRow refers to the number of detector channels per row. To perform a calibration operation, the phantom may be placed at different positions within the scanning field of view of the CT scanner, and multiple scans may be performed on the phantom. The number of scans may be denoted as nScanNum, and the projection angle number for each scan may be marked as nViewNum. For example, the multiple scans may be performed by changing the distance between the center of the phantom and the rotation center of the CT scanner. In some embodiments, the phantom may be a uniform phantom consisting of a single material. In some embodiments, the phantom may include a body made of a first material and a shell made of a second material. In some embodiments, the phantom may be hollow. In some embodiments, the phantom may have a solid core. In some embodiments, the phantom may be made of teflon, propylene, polyethylene, resin, or the like, or any combination thereof. In some embodiments, the phantom 910 may have some special local structures on the surface and/or in the inside, including structures of different sizes, such as a hole, a concave, a bulge, cross grain, or the like, or any combination thereof.

In 604, the processor 210 (e.g., the reconstruction module 440) may generate a preliminary image of the first object based on the preliminary projection values of the first object. The preliminary image may be denoted as imgOrig$_k$, where k refers to the k$^{th}$ scan on the phantom. In some embodiments, the phantom may be scanned by X-ray beams from an X-ray tube, and the X-ray beams that passed through the phantom may be received by the radiation detector(s). The radiation detector(s) may generate electrical signals based on the received X-ray beams. The electrical signals may be converted into digital signals via an Analog-to-Digital Converter and the digital signals may be input to the computing device 140. To process the input digital signals, the processor 210 may divide each scanned layer of the phantom into a plurality of cuboids having the same volume. The processor 210 may determine an X-ray attenuation coefficient of each cuboid based on the digital signals and arrange the X-ray attenuation coefficient of each cuboid in a digital matrix. The processor 210 may further convert the digital matrix into equal-area rectangles having various gray levels (i.e., pixels) via the Analog-to-Digital Converter. The rectangles may be arranged according to the digital matrix to obtain a 2D CT image. In some embodiments, the processor 210 may preprocess (or pre-correct) the preliminary projection values. For example, the preprocessing may include air correction, crosstalk correction, off-focal correction, beam hardening correction, or the like, or any combination thereof. In some embodiments, the data reception module 410 may send the preliminary projection values to the reconstruction module 440 for reconstruction operations. Exemplary methods for reconstruction may include an iterative algorithm, a filtered back projection algorithm, a Radon transform algorithm, a direct Fourier algorithm, or the like, or any combination thereof. Details regarding the determination of the preliminary image may be found elsewhere in the present disclosure, for example, FIG. 7.

In 606, the processor 210 (e.g., the calibration module 430) may process the preliminary image to obtain a calibrated image. The calibrated image may be denoted as imgIdeal$_k$. In some embodiments, for a uniform phantom composed of a single material, the processor may classify the pixels in the preliminary image into material pixels of the phantom body and air pixels according to a simple threshold method. As used herein, the material pixels of the phantom body may refer to pixels corresponding to at least a part of the phantom, and the air pixels may refer to pixels corresponding to air. In some embodiments, a threshold of pixel values may be predetermined for classifying the pixels in the preliminary image. For example, the threshold may be 0, 1, 3, etc. The processor 210 may determine whether the pixel value of each pixel in the preliminary image is greater than the threshold. In response to a determination that the pixel value of the pixel is equal to or less than the threshold, the processor 210 may determine that the pixel is an air pixel. In response to a determination that the pixel value of the pixel is greater than the threshold, the processor 210 may determine that the pixel is a material pixel of the phantom body. An average value of the pixel values of the material pixels of the phantom body may be determined and assigned as a new value to each of the material pixels of the phantom body in the calibrated image. The pixel values of the air pixel in the calibrated image may be set as zeros. In some embodiments, for a phantom including a body made of a first material and a shell made of a second material, the processor 210 may classify the image pixels into the material pixels of the phantom body (also referred to as the first pixels), material pixels of the phantom shell (also referred to as the second pixels), and the air pixels using an image segmentation algorithm. Exemplary image segmentation algorithms may include a k-means clustering algorithm, a maximum entropy algorithm, a maximum variance algorithm, a Statistical Region Merging (SRM) algorithm, a V-net model, a convolutional neural network (CNN) model, or the like, or any combination thereof. An average value of the pixel values of the material pixels of the phantom body may be determined and assigned as a new value to each of the material pixels of the phantom body in the calibrated image. The pixel values of the material pixels of the phantom shell in the calibrated image may be kept consistent with the pixel value of the material pixels of the phantom shell in the preliminary image (imgOrig$_k$). The pixel values of the air pixel in the calibrated image may be set as 0.

In 608, the processor 210 (e.g., the calibration module 430) may determine calibrated projection values based on the calibrated image. In some embodiments, the processor 210 may perform an equal-spaced parallel beam projection on the calibrated image to obtain the forward projection values. In some embodiments, the processor 210 may perform an equiangular fan-beam projection on the calibrated image to obtain the forward projection values. In some embodiments, the processor 210 may perform an interpolation on the forward projection values to obtain the calibrated projection values corresponding to at least one actual position of the at least one detector. The calibrated projection values may be reversely rebinned corresponding to the at least one actual position of the at least one detector to obtain the calibrated projection values. Details regarding the determination of the calibrated projection values based on the calibrated image may also be found elsewhere in the present disclosure, for example, in FIG. 8 and the descriptions thereof.

In 610, the processor 210 (e.g., the calibration module 430) may determine at least one calibration coefficient based on the preliminary projection values and the calibrated projection values. In some embodiments, the at least one calibration coefficient may correspond to the at least one detector. The at least one calibration coefficient may be obtained using one or more mathematical methods. For example, the processor 210 may obtain the calibration coefficient using a polynomial fitting algorithm. As another example, the at least one calibration coefficient may be obtained using a cosine fitting algorithm, a Gaussian fitting algorithm, a least square fitting algorithm, or the like, or any combination thereof. Details regarding the determination of the at least one calibration coefficient may also be found elsewhere in the present disclosure, for example, in FIG. 10 and the descriptions thereof.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be omitted and/or one or more additional operations may be added. For example, the process 600 may further include an operation to obtain an image segmentation model from the storage device a storage (e.g., the ROM 230, the RAM 240) to classify the pixels in the preliminary image.

Figure 7:
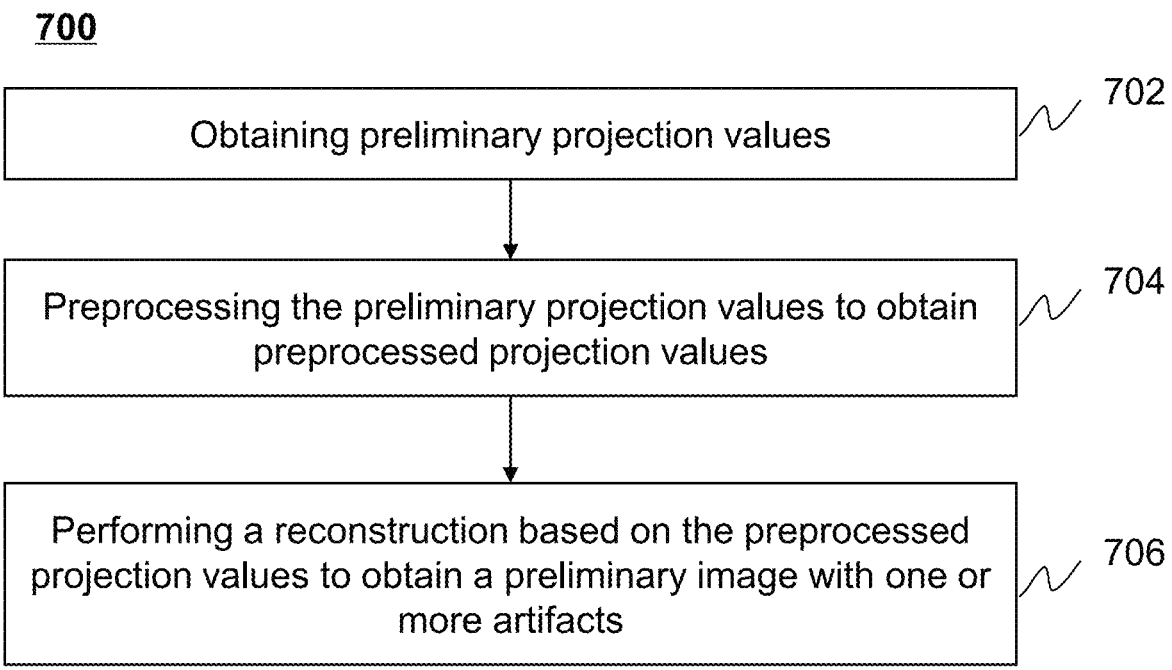
FIG. 7 is a flowchart illustrating an exemplary process for obtaining a preliminary image according to some embodiments of the present disclosure.

FIG. 7 is a flowchart illustrating an exemplary process for obtaining a preliminary image according to some embodiments of the present disclosure. At least a portion of process 700 may be implemented on the computing device 140 as illustrated in FIG. 2 or the mobile device 300 as illustrated in FIG. 3. In some embodiments, one or more operations of the process 700 may be implemented in the imaging system 100 as illustrated in FIG. 1. In some embodiments, one or more operations in the process 700 may be stored in the storage (e.g., the ROM 230, the RAM 240) as a form of instructions, and invoked and/or executed by the computing device 140 (e.g., the processor 210 of the computing device 140). In some embodiments, the instructions may be transmitted in a form of electronic current or electrical signals.

In 702, the processor 210 (e.g., the data reception module 410) may obtain preliminary projection values. In some embodiments, the processor 210 may obtain the preliminary projection values from one or more components of the imaging system 100 shown in FIG. 1 (e.g., the radiation detector 170, the ROM 230 and/or the RAM 240 of the computing device 140). In some embodiments, the processor 210 may obtain the preliminary projection values from an external device.

In 704, the processor 210 (e.g., the preprocessing module 420) may preprocess the preliminary projection values to obtain preprocessed projection values. For example, the preprocessing operation may include air correction, crosstalk correction, off-focal correction, beam hardening correction, or the like, or any combination thereof.

In 706, the processor 210 (e.g., the reconstruction module 440) may perform a reconstruction based on the preprocessed projection values to obtain a preliminary image with one or more artifacts. The one or more artifacts may include a streak artifact, a shading artifact, a ring artifact, a banding artifact, or the like, or any combination thereof. An exemplary cause of the streak artifact may include improper data sampling, volume effects, patient motion, or the like, or any combination thereof. An exemplary cause of a shading artifact may include volume effects, beam hardening, off-focal radiation, incompleteness of the preliminary projection values, or the like, or any combination thereof. An exemplary cause of a ring artifact may include malfunction of the detector channels, the inconsistence of the detector channels, or the like. For instance, the inconsistency of the detector channels may include inconsistent intensity responses of the radiation detector units and the inconsistent responses to photons of different energy levels. In some embodiments, the processor 210 may reconstruct the preliminary image using an imaging reconstruction algorithm. An exemplary imaging reconstruction algorithm may include an iterative algorithm, a filtered back projection algorithm, a Radon transform algorithm, a direct Fourier algorithm, or the like, or any combination thereof.

It should be noted that the above description regarding the process 700 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 8 is a flowchart illustrating an exemplary process for obtaining calibrated projection values according to some embodiments of the present disclosure. At least a portion of process 800 may be implemented on the computing device 140 as illustrated in FIG. 2 or the mobile device 300 as illustrated in FIG. 3. In some embodiments, one or more operations of the process 800 may be implemented in the imaging system 100 as illustrated in FIG. 1. In some embodiments, one or more operations in the process 800 may be stored in the storage (e.g., the ROM 230, the RAM 240) as a form of instructions, and invoked and/or executed by the computing device 140 (e.g., the processor 210 of the computing device 140). In some embodiments, the instructions may be transmitted in a form of electronic current or electrical signals.

In 802, the processor 210 (e.g., the calibration module 430) may perform an equal-spaced parallel beam projection on the calibrated image to obtain the forward projection values. In some embodiments, the radiation detector(s) 170 may be equal-spaced. In some embodiments, the radiation detector(s) 170 may be located in a plane or a curved surface. The forward projection values obtained by the equal-spaced parallel beam projection may be denoted as projFP$_{m,n,k}$ (m=1, 2, . . . , nChannelNumFPPerRow, n=1, 2, . . . , nViewNumFP), where nChannelNumFPPerRow denotes the number of detector channels per row for the equal-spaced parallel beam projection, nViewNumFP denotes the projection angle number for each scan, and k represents the k$^{th}$ scan on the phantom. In some embodiments, other types of forward projections may be performed on the calibrated image to obtain the forward projection values, such as a forward projection of fan beams. For example, the forward projection of fan beams may include an equiangular fan-beam projection, an equal-spaced fan-beam projection, etc. In some embodiments, the processor 210 may perform the forward projection of fan beams according to the geometric structure of the imaging device (e.g., a CT scanner). The forward projection values obtained by the forward projection of fan beams may be denoted as projMeas$_{i,j,k}$ (i=1, 2, . . . , nChannelNum, j=1, 2, . . . , nViewNum), where k represents the k$^{th}$ scan on the phantom.

In 804, the processor 210 (e.g., the calibration module 430) may perform an interpolation on the forward projection values to obtain the calibrated projection values corresponding to at least one actual position of the at least one detector. As used herein, the term "interpolation" refers to a process of estimating a target value corresponding to an intermediate value of independent variable(s) based on the independent variable(s) and known values corresponding to the independent variable(s). In some embodiments, the calibrated projection values obtained by the equal-spaced parallel beam projection may be denoted as projParallel$_{i,n,k}$. In some embodiments, projParallel$_{i,n,k}$ (i.e., the target value) may be determined according to an interpolation function based on a distance between a radiation beam and an rotation center of the imaging device (i.e., the independent variable of the interpolation function), a forward projection value obtained through a forward projection on the calibrated image (i.e., a known value corresponding to the independent variable of the interpolation function), and a distance between a radiation detector and the rotation center of the imaging device (i.e., an intermediate value of the independent variable). In some embodiments, the interpolation function may be related to an interpolation algorithm. Exemplary interpolation algorithms may include a nearest-neighbor interpolation algorithm, a spline interpolation algorithm, a cubic interpolation algorithm, a piecewise linear interpolation algorithm, or the like, or any combination thereof. In some embodiments, projParallel$_{i,n,k}$ may be obtained using the following equation (1):

$$\text{projParallel}_{i,n,k} = \text{interp1}(\text{fDetPosFP}_m, \text{projFP}_{m,n,k}, \text{fDetPosOrg}_i), \quad (1)$$

where i=1, 2, . . . , nChannelNum; m=1, 2, . . . , nChannelNumFPPerRow; n=1, 2, . . . , nViewNumFP; fDetPosFP$_m$ denotes the distance between the m$^{th}$ radiation beam (e.g., X-ray) of the equal-spaced parallel beams and the rotation center; fDetPosOrg$_i$ denotes the distance between the radiation detector i and the rotation center; and interp1 denotes an interpolation function for determining the projParallel$_{i,n,k}$.

In 806, the processor 210 (e.g., the calibration module 430) may reversely rebin the calibrated projection values corresponding to the at least one actual position of the at least one detector to obtain the calibrated projection values. In some embodiments, after obtaining the calibrated projection values of parallel beams projParallel$_{i,n,k}$ corresponding to the at least one actual position of the radiation detector(s) 170, the processor 210 may transform the calibrated projection values of parallel beams to obtain the calibrated projection values of other types of beams. For example, the processor 210 may reversely rebin the calibrated projection values of parallel beams projParallel$_{i,n,k}$ to obtain the calibrated projection values of the fan beams. In some embodiments, the processor 210 may reversely rebin the calibrated projection values for each radiation detector, for example, according to the following equation (2):

$$\text{projIdeal}_{i,j,k} \text{ interp1}(\text{viewAngleFP}_n, \text{projParallel}_{i,n,k}, \theta_i) \quad (2)$$

where viewAngleFP$_n$ denotes the n$^{th}$ projection angle of an equal-spaced parallel beam, and θ$_i$ denotes a constant group.

In some embodiments, the constant group may include one or more angles corresponding to the at least one radiation detector. In some embodiments, $\theta_i$ may be determined based on a projection angle for scanning the phantom, an offset angle after each scan of the focus of the bulb tube, and the angle of the detector i relative to the focus of the bulb tube. In some embodiments, the constant group $\theta_i$ may be determined according to the following equation (3):

$$\theta_i = \mathrm{mod}(\mathrm{viewAngle}_j + \beta_{FS} - \gamma_i, 2\pi), \tag{3}$$

Wherein ViewAngle$_j$ denotes the $j^{th}$ projection angle for scanning the phantom, $\beta_{FS}$ is the offset angle after each scan of the focus of the bulb tube, $\gamma_i$ is the angle of the detector i relative to the focus of the bulb tube, and the return value of mod(x, y) is x−n*y (n is an integer no greater than x/y).

It should be noted that the above description regarding the process 800 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be omitted and/or one or more additional operations may be added. For example, the operation 806 may be omitted if the calibrated projection values obtained based on the equal-spaced parallel beam projection do not need to be transformed to calibrated projection values of other types of beams (e.g., fan beams).

Figure 9A:
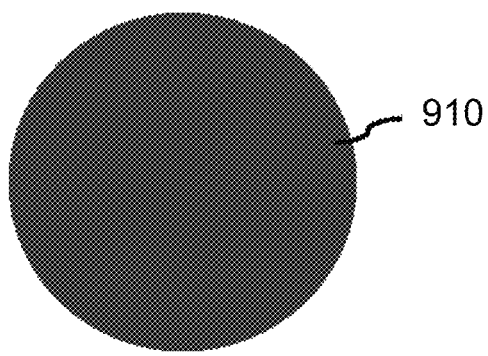
FIGS. 9A-9B are schematic diagrams illustrating exemplary phantoms according to some embodiments of the present disclosure.
Figure 9B:
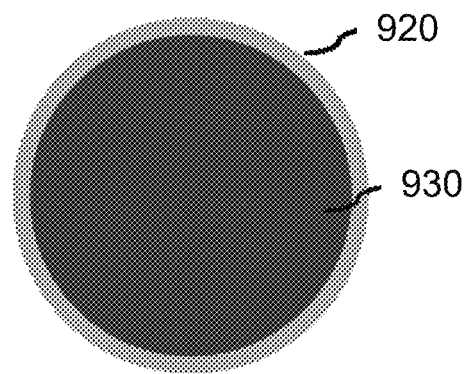

FIGS. 9A-9B are schematic diagrams illustrating exemplary phantoms according to some embodiments of the present disclosure. As shown in FIG. 9A, the single material for the phantom 910 may include teflon, propylene, polyethylene, resin, or the like, or any combination thereof. The shape of the phantom 910 may include but not limited to a cylinder, a sphere, a cube, a simulation shape of a human body or a part thereof (e.g., a whole body, a head, a lung, an abdomen), or the like. In some embodiments, the phantom 910 may have a solid core. In some embodiments, the phantom 910 may be hollow. In some embodiments, the phantom 910 may contain a medium, such as water or water-equivalent plastic. In some embodiments, the phantom 910 may include air in the inside. In some embodiments, the phantom 910 may have some special local structures on the surface and/or in the inside, including structures of different sizes, such as a hole, cross grain, a letter, a circle, or the like, or any combination thereof. As shown in FIG. 9B, the phantom may include a shell 920 and a non-shell structure 930. The non-shell structure 930 may also be referred to as the phantom body. In some embodiments, the shell 920 and/or the non-shell structure 930 may be made of different materials. For example, the shell 920 may be made of a second material, and the non-shell structure 930 may be made of a first material. In some embodiments, the first material and/or the second material may be similar to the single material of the phantom 910. In some embodiments, the shell 920 may have a uniform thickness, such as 0.5 cm, 1 cm, 2 cm, or the like. In some embodiments, the shell 920 may have a non-uniform thickness. The constituent materials of the shell 920 and/or the non-shell structure 930 may include teflon, propylene, polyethylene, resin, or the like, or any combination thereof. In some embodiments, the shell 920 may include air. In some embodiments, the shell 920 and the non-shell structure 930 may be made of different materials. For example, the shell 920 may be made of polyethylene and the non-shell structure 930 may be made of water equivalent plastic.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the phantom may have multiple layers of shell made of the same or different materials.

Figure 10:
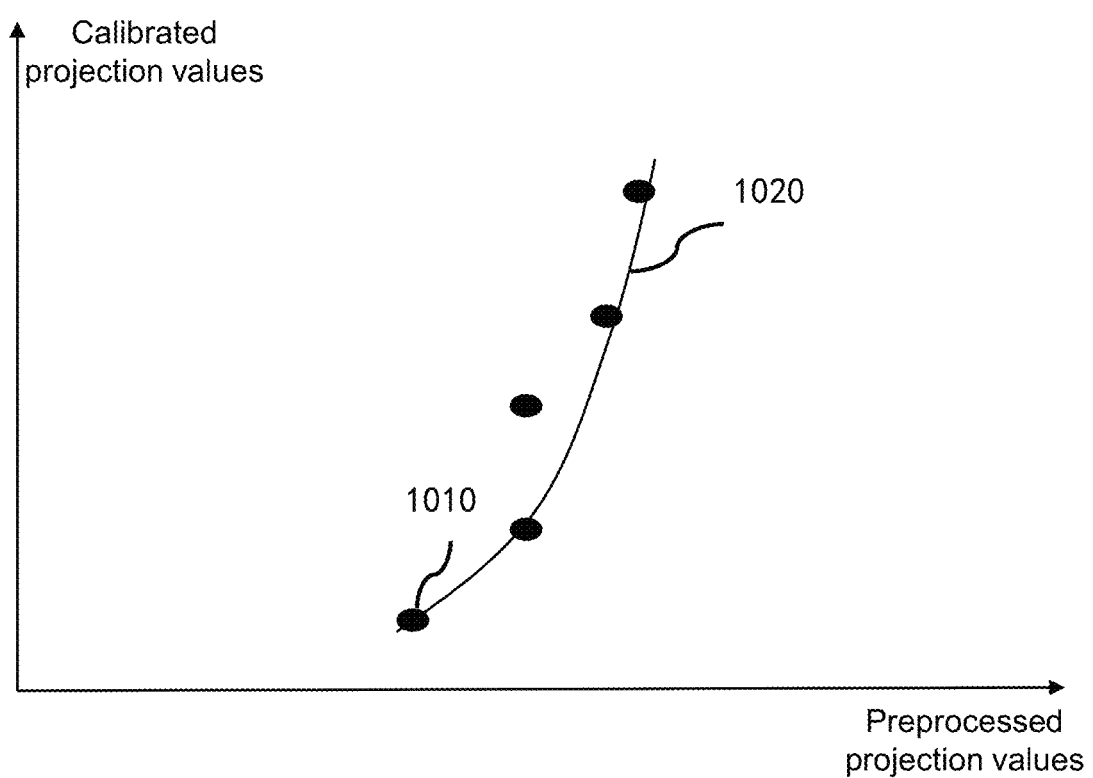
FIG. 10 is a schematic diagram illustrating an exemplary fitting result of the calibrated projection values and the preprocessed projection values according to some embodiments of the present disclosure.

FIG. 10 is a schematic diagram illustrating an exemplary fitting result of the calibrated projection values and the preprocessed projection values according to some embodiments of the present disclosure. As shown in FIG. 10, each preprocessed projection value and the corresponding calibrated projection value may be represented by a point (e.g., a fitting point 1010) in a two-dimensional coordinate system. The X-axis and the Y-axis of the two-dimensional coordinate system may correspond to the preprocessed projection values and the calibrated projection values, respectively. The processor 210 may further perform the polynomial fitting (e.g., a polynomial curve fitting) on two or more fitting points to obtain a polynomial containing the calibration coefficient. An exemplary fitting curve 1020 corresponding to the polynomial is shown in the two-dimensional coordinate system in FIG. 10. In some embodiments, the preprocessed projection value and the calibrated projection values may be fitted according to the following equation (4):

$$\mathrm{projIdeal}_{i,j,k} = \Sigma_{p=0}^{P} \alpha_{i,p} * \mathrm{proMeas}_{i,j,k}^{p}, \tag{4}$$

where j=1, 2, . . . , nViewNum; k=1, 2, . . . , nScanNum; $\alpha_{i,p}$ (p=0, . . . , P) is the calibration coefficient of the radiation detector channel; and P is the polynomial order of the fitting algorithms. Similar calculations may be performed on all the detector channels to obtain all the calibration coefficients corresponding to all the radiation detectors. The calibration coefficient $\alpha_{i,p}$ may be used to remove artifacts in other preliminary images containing artifacts (e.g., obtained by one or more scans on a second object). For example, the second object may be a patient.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, other fitting algorithms may also be used to generate the fitting result of the calibrated projection values and the preprocessed projection values, such as a cosine fitting algorithm, a Gaussian fitting algorithm or a least square fitting algorithm.

Figure 11:
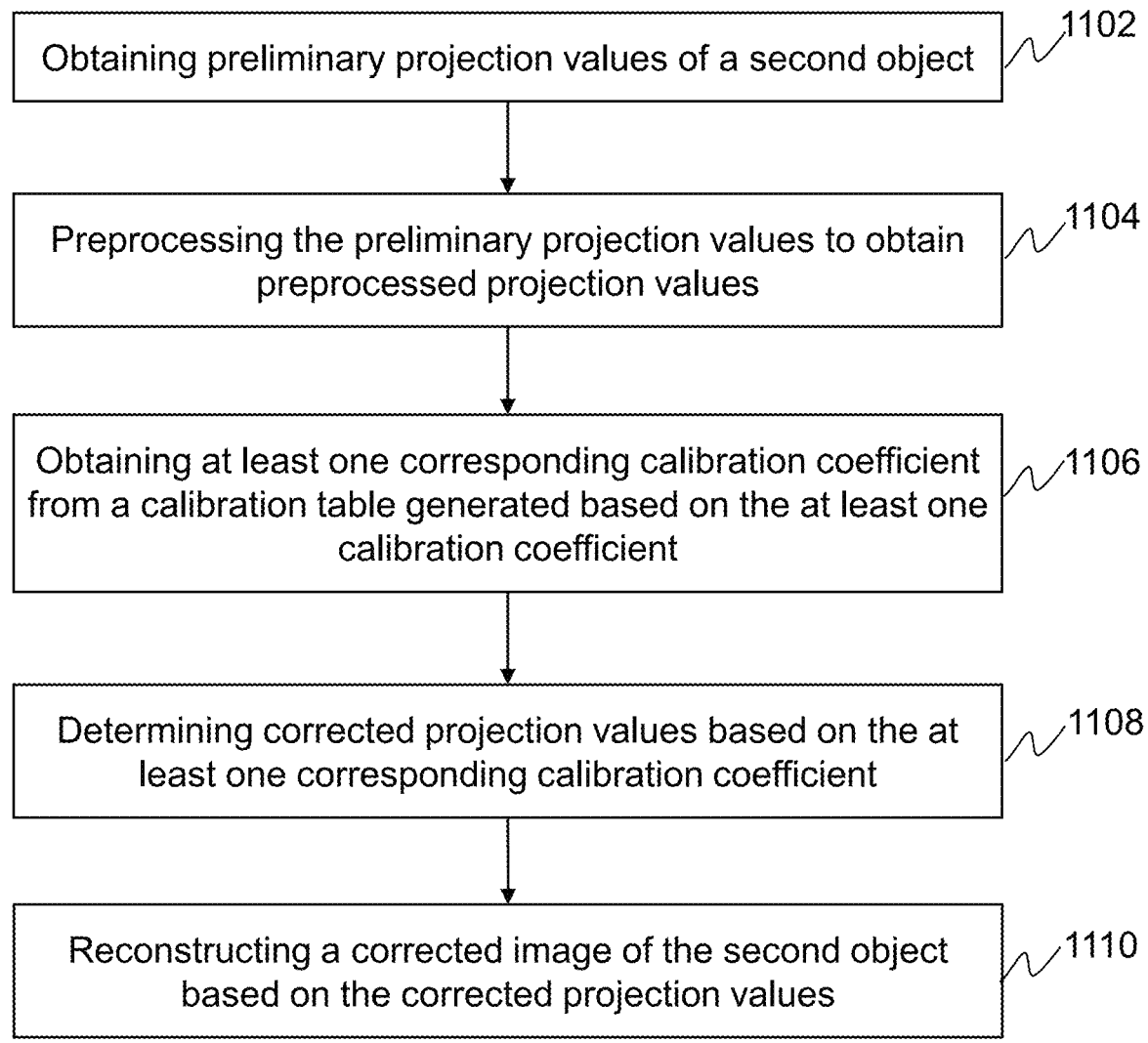
FIG. 11 is a flowchart illustrating an exemplary process for reconstructing a corrected image according to some embodiments of the present disclosure.

FIG. 11 is a flowchart illustrating an exemplary process for reconstructing a corrected image according to some embodiments of the present disclosure. At least a portion of process 1100 may be implemented on the computing device 140 as illustrated in FIG. 2 or the mobile device 300 as illustrated in FIG. 3. In some embodiments, one or more operations of the process 1100 may be implemented in the imaging system 100 as illustrated in FIG. 1. In some embodiments, one or more operations in the process 1100 may be stored in the storage (e.g., the ROM 230, the RAM 240) as a form of instructions, and invoked and/or executed by the computing device 140 (e.g., the processor 210 of the computing device 140). In some embodiments, the instructions may be transmitted in a form of electronic current or electrical signals.

In 1102, the processor 210 (e.g., the data reception module 410) may obtain preliminary projection values of a second object. The second object may include a body, a substance, an object, or the like, or a combination thereof. In some embodiments, the object may include a specific portion of a body, such as a head, a thorax, an abdomen, or the like, or a combination thereof. In some embodiments, the object may include a specific organ or region of interest, such as an esophagus, a trachea, a bronchus, a stomach, a gallbladder, a small intestine, a colon, a bladder, a ureter, a uterus, a fallopian tube, etc. In some embodiments, the preliminary projection values of the second object may be obtained by the same imaging device for scanning the first object.

In 1104, the processor 210 (e.g., the preprocessing module 420) may preprocess the preliminary projection values to obtain preprocessed projection values. In some embodiments, the preprocessing may eliminate or reduce the influence of known physical factors on the preliminary projection values. For example, the preprocessing may include air correction, crosstalk correction, off-focal correction, beam hardening correction, or the like, or any combination thereof. The preprocessed projection values may be denoted as ProjOrig.

In 1106, the processor 210 (e.g., the data reception module 410) may obtain at least one corresponding calibration coefficient from a calibration table generated based on the at least one calibration coefficient. In some embodiments, the processor 210 may obtain the at least one calibration coefficient $\alpha_{i,p}$ corresponding to the detector channel i from a storage (e.g., the ROM 230, the RAM 240 of the computing device 140).

In 1108, the processor 210 (e.g., the calibration module 430) may determine corrected projection values based on the at least one corresponding calibration coefficient. In some embodiments, the corrected projection values ProjCorr$_i$ may be determined according to the following equation (5):

$$\text{ProjCorr}_i = \Sum_{p=0}^{P} \alpha_{i,p} * \text{ProjOrig}_i^p, \quad (5)$$

In 1110, the processor 210 (e.g., the reconstruction module 440) may reconstruct a corrected image of the second object based on the corrected projection values. The corrected image may include no artifacts or reduced artifacts. The processor 210 may reconstruct the corrected image of the second object using a common reconstruction algorithm. An exemplary reconstruction algorithm may include an iterative algorithm, a filtered back projection algorithm (FBP), a Radon transform algorithm, a direct Fourier algorithm, an ordered subset expectation (OSEM) maximization algorithm, or the like, or any combination thereof.

It should be noted that the above description regarding the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 12:
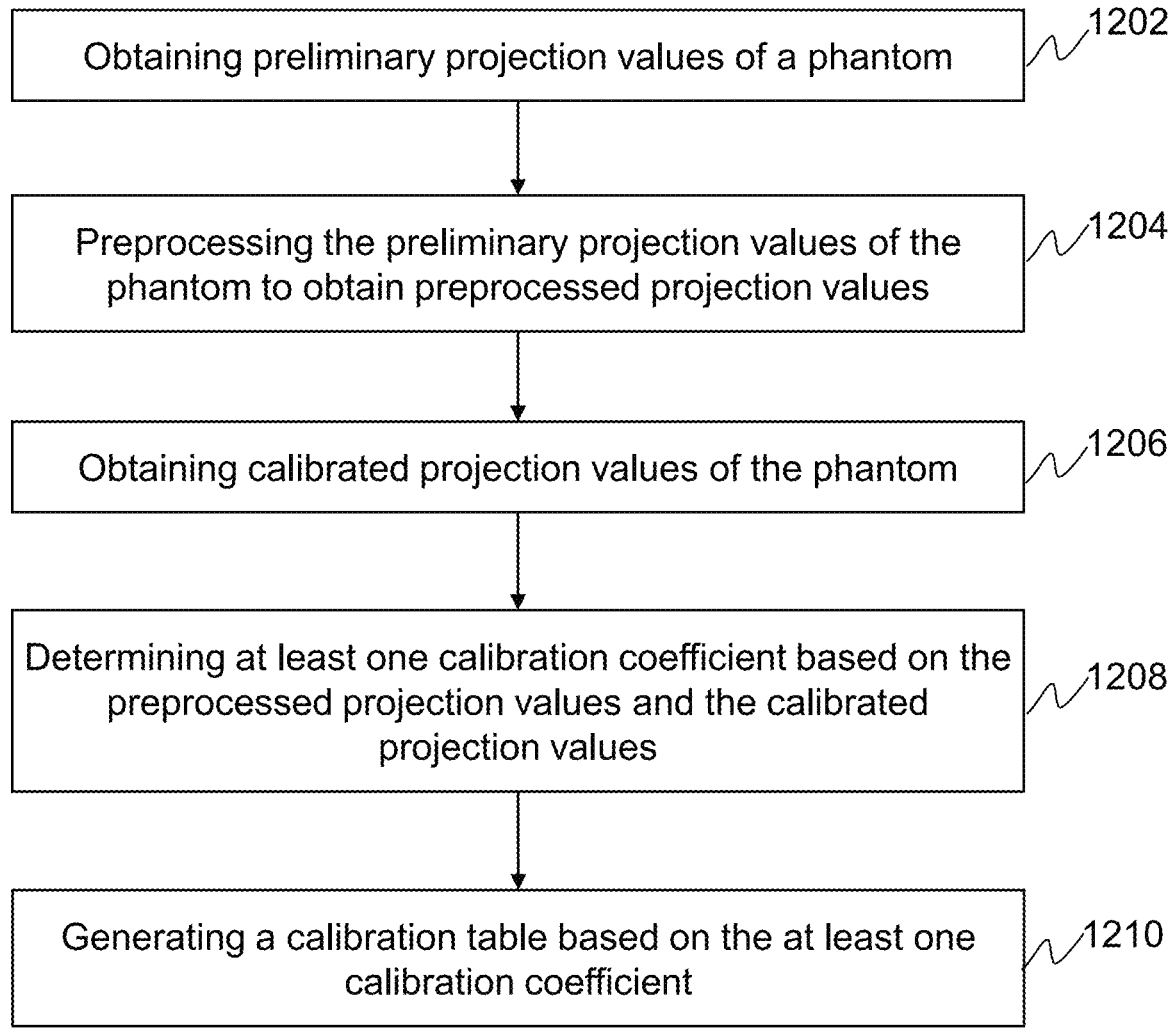
FIG. 12 is a flowchart illustrating an exemplary process for determining at least one calibration coefficient and generating a calibration table according to some embodiments of the present disclosure.

FIG. 12 is a flowchart illustrating an exemplary process for determining at least one calibration coefficient and generating a calibration table according to some embodiments of the present disclosure. At least a portion of process 1200 may be implemented on the computing device 140 as illustrated in FIG. 2 or the mobile device 300 as illustrated in FIG. 3. In some embodiments, one or more operations of the process 1200 may be implemented in the imaging system 100 as illustrated in FIG. 1. In some embodiments, one or more operations in the process 1200 may be stored in the storage (e.g., the ROM 230, the RAM 240) as a form of instructions, and invoked and/or executed by the computing device 140 (e.g., the processor 210 of the computing device 140). In some embodiments, the instructions may be transmitted in a form of electronic current or electrical signals.

In 1202, the processor 210 (e.g., the data reception module 410) may obtain preliminary projection values of a phantom. In some embodiments, the phantom may have a structure similar to that of a human body. As an example, an elliptical cylinder phantom having an elliptical cross section may be used in the process 1200, since many parts of the human body may have an elliptical cross section. When the cross section of the phantom is an ellipse, each radiation detector may receive the energy intensity of X-rays that have passed regions of various thicknesses of the phantom during the rotation of the gantry. Moreover, the weight of the phantom may be reduced by increasing the ratio of the long-axis to short-axis of the ellipse. In some embodiments, the phantom may be a uniform phantom composed of a single material. For example, the material may include polypropylene, polyethylene, polytetrafluoroethylene, or the like, or any combination thereof. In some embodiments, the phantom may be a relatively large cylinder sleeve (also referred to as a shell) containing a relatively small cylinder in the inside. The relatively small cylinder and the relatively large cylinder sleeve may be made of a same material or a different material. In some embodiments, the method for scanning the phantom may include placing the phantom in different positions within the scanning range of the imaging device to simulate different positions of different parts of the human body within the scanning range of the imaging device. For example, the phantom may be placed near the center of the scanning range of the imaging device. The distance between the center of the scanning range and the phantom (e.g., the geometrical center of the cross section of the phantom) may be 50 mm, 100 mm, or the like. The processor 210 may obtain the tomographic data (i.e., preliminary projection values) of at least one scan on the phantom at different positions. The tomographic data may be used for later image correction. For example, the processor 210 may determine the at least one calibration coefficient based on the tomographic data of at least one scan on the phantom at different positions. The preliminary projection data of a second object (e.g., a patient) may be corrected according to the at least one calibration coefficient.

Figure 13:
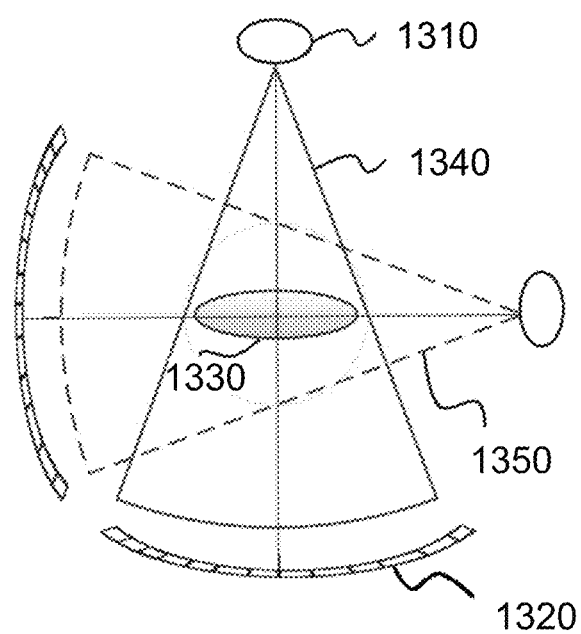
FIG. 13 is a schematic diagram illustrating an exemplary scan on an object according to some embodiments of the present disclosure.

FIG. 13 is a schematic diagram illustrating an exemplary scan on an object according to some embodiments of the present disclosure. 1310 represents an X-ray tube, 1320 represents a radiation detector, and 1330 represents the phantom. As shown in FIG. 13, the phantom 1330 is placed at the center of the scanning range of the imaging device (i.e., the center of the ellipse is near the rotation center of the gantry). The X-ray tube 1310 may emit X-rays toward the X-ray radiation detector 1320, which may pass through the phantom 1330. The X-rays passing through the phantom 1330 may be detected by the radiation detector 1320 to obtain the preliminary projection values when the phantom 1330 is placed at the center. The position for the phantom may cause the full exposure of the phantom 1330 to X-rays propagating from the X-ray tube 1310 to the X-ray radiation detector 1320 in a fan-shaped region 1340. The radiation detector 1320 may include a plurality of detector channels. During the scanning process, the X-ray tube 1310 and the radiation detector 1320 may be rotated around the rotation center of the gantry of the imaging device. After one or more rounds of rotation of the X-ray tube 1310 and the X-ray radiation detector 1320, the preliminary projection values of the phantom at the rotation center. The phantom may be placed in different positions within the scanning range of the imaging device to obtain preliminary projection values of the phantom at different positions. For example, the distance between the center of the scanning range and the phantom (e.g., the geometrical center of the cross section of the phantom) may be 50 mm, 100 mm, or the like.

As shown in FIG. 12, in 1204, the processor 210 (e.g., the preprocessing module 420) may preprocess the preliminary projection values of the phantom to obtain preprocessed projection values. In some embodiments, the preprocessing operation may eliminate or reduce the influence of known physical factors on the preliminary projection values. For example, the preprocessing may include air correction, crosstalk correction, off-focal correction, beam hardening correction, or the like, or any combination thereof. In some embodiments, the preprocessed projection values may be denoted as $\text{ProjM}_{i,j,k}$, where $1=1, 2, \ldots,$ nChannelNum; $j=1, 2, \ldots,$ nViewNum; and $k=1, 2, \ldots,$ nScanNum; nChannelNum denotes the number of radiation detector units; nViewNum denotes the projection angle number for each tomographic scan; and nScanNum denotes the number of scans.

In 1206, the processor 210 (e.g., the calibration module 430) may obtain calibrated projection values of the phantom. To obtain the calibrated projection values of the phantom, the processor 210 (e.g., the construction module 440) may perform a reconstruction on the preprocessed projection values $\text{ProjM}_{i,j,k}$ of each scan to obtain a preliminary image denoted as $\text{Image}_k$. The preliminary image may have one or more artifacts, such as a streak artifact, a shading artifact, a ring artifact, a banding artifact, or the like, or any combination thereof. The processor 210 (e.g., the calibration module 430) may extract the interface between the phantom and the air in the preliminary image $\text{Image}_k$. An elliptical equation may be used to fit the pixels of the interface to obtain the cross-section equation of the cross section of the phantom. In some embodiment, the cross-section equation may be the following equation (6)

$$\frac{[(x-x_0)*\cos(t)+(y-y_0)*\sin(t)]^2}{a^2} + \frac{[(x-x_0)*\sin(t)+(y-y_0)*\cos(t)]^2}{b^2} = 1, \quad (6)$$

Where $(x_0, y_0)$ denotes the center position of the phantom, t denotes an angle between the long axis of the phantom section and the coordinate system including the X and Y axes (e.g., the coordinate system shown in FIG. 1). For the X-rays emitted from the X-ray tube after being attenuated by the phantom and reached the radiation detector, only one straight line equation (also referred to as a scanning equation) for each X-ray may be determined since the X-ray may pass the focus coordinate of the X-ray tube $(X_S, Y_S)$, and the coordinates of the radiation detector $(X_{dI}, Y_{dI})$. In some embodiments, the straight line equation of the X-ray may be the following equation (7):

$$Ax+By+C=0, \quad (7)$$

Where A, B, and C are parameters including X-ray rotation information, $A=Y_{dI}-Y_S$; $B=X_S-X_{dI}$; and $C=X_{dI}*Y_S-X_S*Y_{dI}$. The processor 210 may determine whether there is a solution that satisfies both the equation (6) and the equation (7). There may be three cases for the solution. In response to a determination that there is no solution satisfying both the equation (6) and the equation (7), it may indicate that there is no intersection point between the straight line (X-ray) and the ellipse, and the corresponding calibrated projection values may be determined as 0. In response to a determination that there is only one solution satisfying both the equation (6) and the equation (7), it may indicate that the straight line (X-ray) and the ellipse are tangent, and the corresponding calibrated projection values may also be determined as 0. In response to a determination that there are two solutions satisfying both the equation (6) and the equation (7), denoted as $(X_1, Y_1)$ and $(X_2, Y_2)$, respectively, it may indicate that the straight line (X-ray) intersects the ellipse. The calibrated projection values may be determined based on the distance between two intersection points. In some embodiments, the calibrated projection values may be determined according to the following equation (8):

$$\text{ProjI}_{I,j,k}=\sqrt{(X_1-X_2)^2+(Y_1-Y_2)^2}*\mu_0, \quad (8)$$

where $\mu_0$ denotes the linear attenuation coefficient of the phantom (e.g., a rectangle mentioned in operation 604) regarding the X-ray with the energy $E_0$kev, $E_0$ is the energy of the X-ray, key (kiloelectron volts) is the unit of energy, and $\text{ProjI}_{I,j,k}$ is the calibrated projection values. In this manner, the calibrated projection values of the radiation detector i may be obtained by establishing a scanning equation of a straight line passing through the coordinate of the focus of the X-ray tube and the radiation detector i, and determine the solution(s) satisfying both the scanning equation and the cross-section equation.

In 1208, the processor 210 (e.g., the calibration module 430) may determine at least one calibration coefficient based on the preprocessed projection values and the calibrated projection values. In some embodiments, the calibration coefficient corresponding to each radiation detector may be determined according to one or more processed projection values related to each radiation detector and the corresponding one or more calibrated projection values. Specifically, for each radiation detector i, all of the one or more preprocessed projection values $\text{ProjM}_{I,j,k}$ of the radiation detector i may be used as an independent variable, and the one or more corresponding calibrated projection values $\text{ProjM}_{I,j,k}$ may be used as a dependent variable. The processor 210 may perform an N-order polynomial fitting on the preprocessed projection value(s) and the calibrated projection value(s) to obtain the calibration coefficient $\alpha_{I,n}$, for example, as shown in the following equation (9):

$$\text{ProjI}_{I,j,k}=\Sigma_{n=0}^{N}\alpha_{I,n}*\text{ProjM}_{I,j,k}^n \quad (9)$$

where $j=1, 2, \ldots,$ nViewNum; $k=1, 2, \ldots,$ nScanNum; nViewNum refers to the projection angle for each scan; and nScanNum is the number of scans.

In 1210, the processor 210 (e.g., the calibration coefficient 420) may generate a calibration table based on the at least one calibration coefficient. For example, the calibration table may include the location and/or an identification number of each of the at least one radiation detector and the at least one calibration coefficient corresponding to the at least one radiation detector. In some embodiments, the calibration table may be stored in a storage (e.g., the ROM 230, the RAM 240 of the computing device 140). In some embodiments, the calibration table may be stored in an external data source, such as a mobile hard disk drive.

It should be noted that the above description regarding the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed object matter requires more features than are expressly recited in each claim. Rather, claim object matter lie in less than all features of a single foregoing disclosed embodiment.

I claim:

1. A method implemented on a computing device having at least one storage device storing a set of instructions for determining at least one artifact calibration coefficient, and at least one processor in communication with the at least one storage device, comprising:

obtaining, by the at least one processor, preliminary projection values of a first object generated based on radiation rays that are emitted from a radiation emitter and passed through the first object, the radiation rays being detected by at least one radiation detector;

generating, by the at least one processor, a preliminary image of the first object based on the preliminary projection values of the first object;

generating, by the at least one processor, calibrated projection values of the first object based on the preliminary image;

determining, by the at least one processor, a relationship between the preliminary projection values and the calibrated projection values;

for each of the at least one radiation detector,
determining, by the at least one processor, a location of the radiation detector; and
determining, by the at least one processor, an artifact calibration coefficient corresponding to the radiation detector based on the relationship between the preliminary projection values and the calibrated projection values and the location of the radiation detector;
wherein the generating the calibrated projection values of the first object based on the preliminary image includes:
obtaining a cross-section equation of the first object based on the preliminary image of the first object;
obtaining a series of scanning equations, wherein each of the series of scanning equations is associated with one of the radiation rays; and
determining the calibrated projection values of the first object based on the cross-section equation and the series of scanning equations of the first object.

2. The method of claim 1, wherein the generating the calibrated projection values of the first object based on the preliminary image comprises:
generating a calibrated image of the first object based on the preliminary image; and
generating the calibrated projection values based on the calibrated image.

3. The method of claim 2, wherein the first object is a phantom made of a single material, and the generating the calibrated image of the first object based on the preliminary image comprises:
obtaining a value of each of pixels in the preliminary image;
determining an average value of at least portion of the pixels in the preliminary image; and
assigning the average value of the at least portion of the pixels as a new value to the each of the at least portion of the pixels in the preliminary image to generate the calibrated image.

4. The method of claim 2, wherein the first object is a phantom including a body made of a first material and a shell made of a second material, and the generating the calibrated image of the first object based on the preliminary image comprises:
obtaining a value of each of first pixels in the preliminary image associated with the body of the first object and a value of each of second pixels in the preliminary image associated with the shell of the first object;
determining an average value of the first pixels; and
assigning the average value of the first pixels as a new value to the each of the first pixels and retaining the value of the each of second pixels to generate the calibrated image.

5. The method of claim 2, wherein the generating the calibrated projection values based on the calibrated image comprises:
performing a forward projection on the calibrated image to generate forward projection values; and
for each of the at least one radiation detector,
determining a calibrated projection value for the radiation detector based on the location of the radiation detector and the forward projection values.

6. The method of claim 1, wherein the determining the calibrated projection values of the first object based on the cross-section equation and the series of scanning equations of the first object comprises:
for each of the series of scanning equations,
determining, when there is no solution satisfying both the scanning equation and the cross-section equation, the calibrated projection value as zero;
determining, when there is only one solution satisfying both the scanning equation and the cross-section equation, the calibrated projection value as zero; and
determining, when there are two solutions satisfying both the scanning equation and the cross-section equation, the calibrated projection value based on the distance between the two solutions.

7. The method of claim 1, further comprising:
performing a preprocessing on the preliminary projection values to generate preprocessed projection values; and
generating the preliminary image based on preprocessed projection values.

8. The method of claim 1, further comprising:
obtaining, by the at least one processor, preliminary projection values of a second object generated based on radiation rays that are emitted from the radiation emitter and passed through the second object, the radiation rays being detected by the at least one radiation detector;
determining corrected projection values of the second object based on the preliminary projection values of the second object and the at least one artifact calibration coefficient associated with the at least one radiation detector; and
generating a corrected image of the second object based on the corrected projection values.

9. The method of claim 1, wherein the relationship between the preliminary projection values and the calibrated projection values is represented by a fitting curve.

10. A system for determining at least one artifact calibration coefficient, comprising:
at least one storage medium storing a set of instructions; and
at least one processor configured to communicate with the at least one storage medium, wherein when executing the set of instructions, the at least one processor is directed to cause the system to:
obtain preliminary projection values of a first object generated based on radiation rays that are emitted from a radiation emitter and passed through the first object, the radiation rays being detected by at least one radiation detector;
generate a preliminary image of the first object based on the preliminary projection values of the first object;
generate calibrated projection values of the first object based on the preliminary image;
determine a relationship between the preliminary projection values and the calibrated projection values;
for each of the at least one radiation detector,
determine a location of the radiation detector; and
determine an artifact calibration coefficient corresponding to the radiation detector based on the relationship between the preliminary projection values and the calibrated projection values and the location of the radiation detector;
wherein to generate the calibrated projection values of the first object based on the preliminary image, the at least one processor is directed to cause the system to:
obtain a cross-section equation of the first object based on the preliminary image of the first object;
obtain a series of scanning equations, wherein each of the series of scanning equations is associated with one of the radiation rays; and
determine the calibrated projection values of the first object based on the cross-section equation and the series of scanning equations of the first object.

11. The system of claim 10, wherein to generate the calibrated projection values of the first object based on the preliminary image, the at least one processor is directed to cause the system to:
  generate a calibrated image of the first object based on the preliminary image; and
  generate the calibrated projection values based on the calibrated image.

12. The system of claim 11, wherein the first object is a phantom made of a single material, and to generate the calibrated image of the first object based on the preliminary image, the at least one processor is directed to cause the system to:
  obtain a value of each of pixels in the preliminary image;
  determine an average value of at least portion of the pixels in the preliminary image; and
  assign the average value of the at least portion of the pixels as a new value to the each of the at least portion of the pixels in the preliminary image to generate the calibrated image.

13. The system of claim 11, wherein the first object is a phantom including a body made of a first material and a shell made of a second material, and to generate the calibrated image of the first object based on the preliminary image, the at least one processor is directed to cause the system to:
  obtain a value of each of first pixels in the preliminary image associated with the body of the first object and a value of each of second pixels in the preliminary image associated with the shell of the first object;
  determine an average value of the first pixels; and
  assign the average value of the first pixels as a new value to the each of the first pixels and retaining the value of the each of second pixels to generate the calibrated image.

14. The system of claim 11, wherein to generating the calibrated projection values based on the calibrated image, the at least one processor is directed to cause the system to:
  perform a forward projection on the calibrated image to generate forward projection values; and
  for each of the at least one radiation detector,
    determine a calibrated projection value for the radiation detector based on the location of the radiation detector and the forward projection values.

15. The system of claim 10, wherein to determine the calibrated projection values of the first object based on the cross-section equation and the series of scanning equations of the first object, the at least one processor is directed to cause the system to:
  for each of the series of scanning equations,
    determine, when there is no solution satisfying both the scanning equation and the cross-section equation, the calibrated projection value as zero;
    determine, when there is only one solution satisfying both the scanning equation and the cross-section equation, the calibrated projection value as zero; and
    determine, when there are two solutions satisfying both the scanning equation and the cross-section equation, the calibrated projection value based on the distance between the two solutions.

16. The system of claim 10, wherein the relationship between the preliminary projection values and the calibrated projection values is represented by a fitting curve.

17. The system of claim 10, wherein the at least one processor is directed to cause the system to:
  perform a preprocessing on the preliminary projection values to generate preprocessed projection values; and
  generate the preliminary image based on preprocessed projection values.

18. The system of claim 10, wherein the at least one processor is directed to cause the system to:
  obtain preliminary projection values of a second object generated based on radiation rays that are emitted from the radiation emitter and passed through the second object, the radiation rays being detected by the at least one radiation detector;
  determine corrected projection values of the second object based on the preliminary projection values of the second object and the at least one artifact calibration coefficient associated with the at least one radiation detector; and
  generate a corrected image of the second object based on the corrected projection values.

19. A non-transitory computer readable medium, comprising at least one set of instructions for determining at least one artifact calibration coefficient, wherein when executed by at least one processor of a computer device, the at least one set of instructions directs the at least one processor to:
  obtain preliminary projection values of a first object generated based on radiation rays that are emitted from a radiation emitter and passed through the first object, the radiation rays being detected by at least one radiation detector;
  generate a preliminary image of the first object based on the preliminary projection values of the first object;
  generate calibrated projection values of the first object based on the preliminary image;
  determine a relationship between the preliminary projection values and the calibrated projection values;
  for each of the at least one radiation detector,
    determine a location of the radiation detector; and
    determine an artifact calibration coefficient corresponding to the radiation detector based on the relationship between the preliminary projection values and the calibrated projection values and the location of the radiation detector;
  wherein to generate the calibrated projection values of the first object based on the preliminary image, the at least one processor is directed to cause the system to:
    obtain a cross-section equation of the first object based on the preliminary image of the first object;
    obtain a series of scanning equations, wherein each of the series of scanning equations is associated with one of the radiation rays; and
    determine the calibrated projection values of the first object based on the cross-section equation and the series of scanning equations of the first object.

20. The non-transitory computer readable medium of claim 19, wherein to determine the calibrated projection values of the first object based on the cross-section equation and the series of scanning equations of the first object, the at least one set of instructions directs the at least one processor to:
  for each of the series of scanning equations,
    determine, when there is no solution satisfying both the scanning equation and the cross-section equation, the calibrated projection value as zero;
    determine, when there is only one solution satisfying both the scanning equation and the cross-section equation, the calibrated projection value as zero; and
    determine, when there are two solutions satisfying both the scanning equation and the cross-section equation, the calibrated projection value based on the distance between the two solutions.

* * * * *